Jan. 27, 1953 W. A. HUBER ET AL 2,627,069
DUAL SCANNING ANTENNA RADAR SYSTEM
Filed Jan. 6, 1945 8 Sheets-Sheet 1

*INVENTOR.*
WILLIAM A. HUBER
NICHOLAS T. VOLSK
BY
*William D. Hall*
ATTORNEY

Jan. 27, 1953   W. A. HUBER ET AL   2,627,069
DUAL SCANNING ANTENNA RADAR SYSTEM
Filed Jan. 6, 1945   8 Sheets-Sheet 2
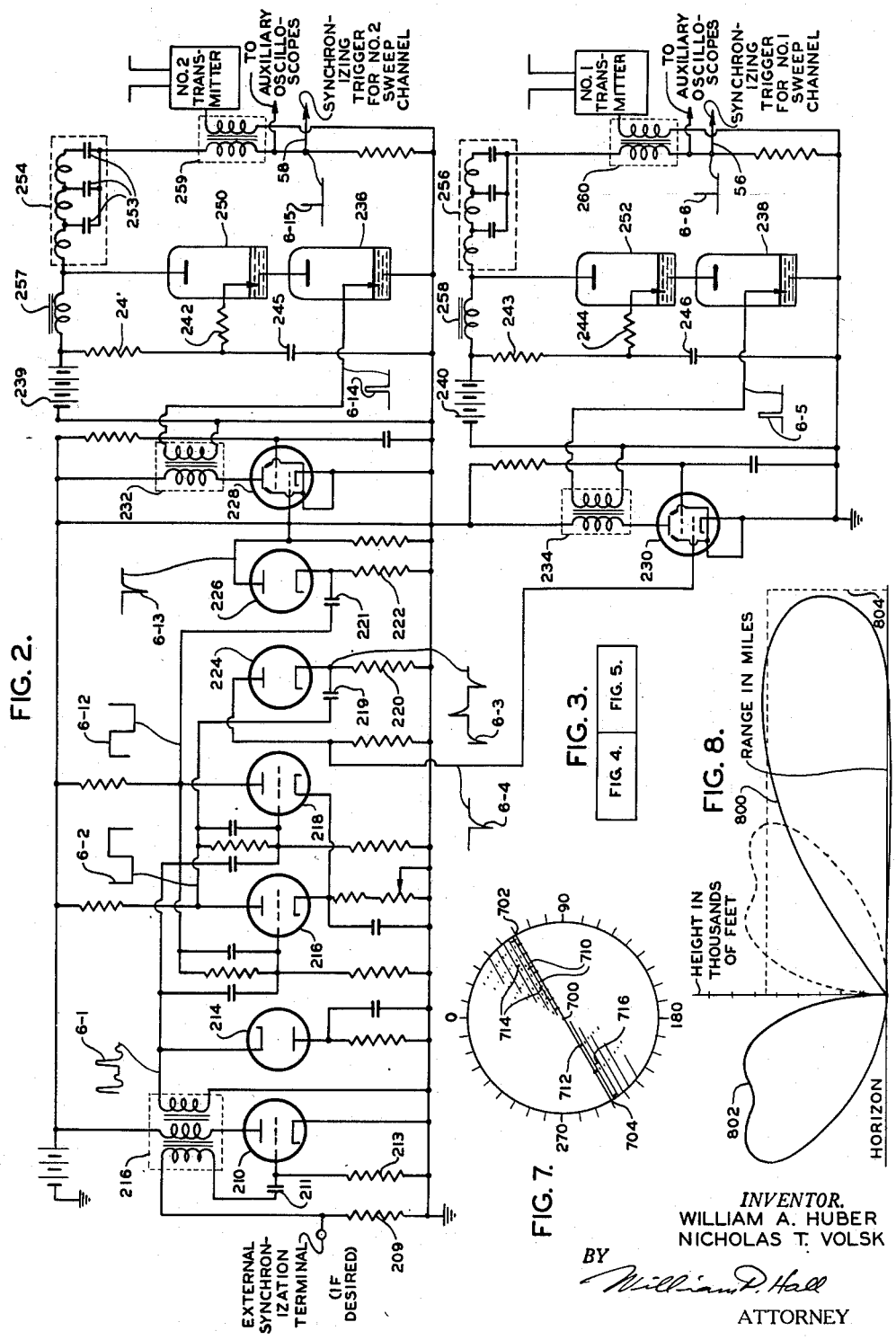
INVENTOR.
WILLIAM A. HUBER
NICHOLAS T. VOLSK
BY
William P. Hall
ATTORNEY INVENTOR.
WILLIAM A. HUBER
NICHOLAS T. VOLSK
BY
William H. Hall
ATTORNEY Jan. 27, 1953 W. A. HUBER ET AL 2,627,069
DUAL SCANNING ANTENNA RADAR SYSTEM
Filed Jan. 6, 1945 8 Sheets-Sheet 5

INVENTOR.
WILLIAM A. HUBER
NICHOLAS T. VOLSK
BY
William D. Hall
ATTORNEY

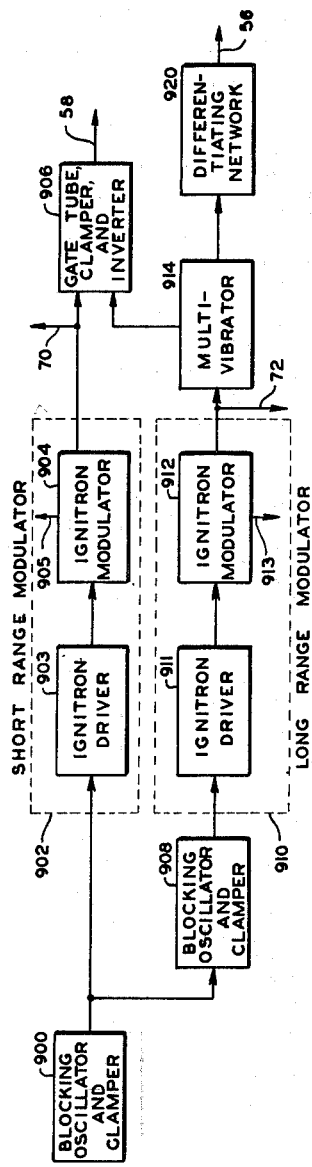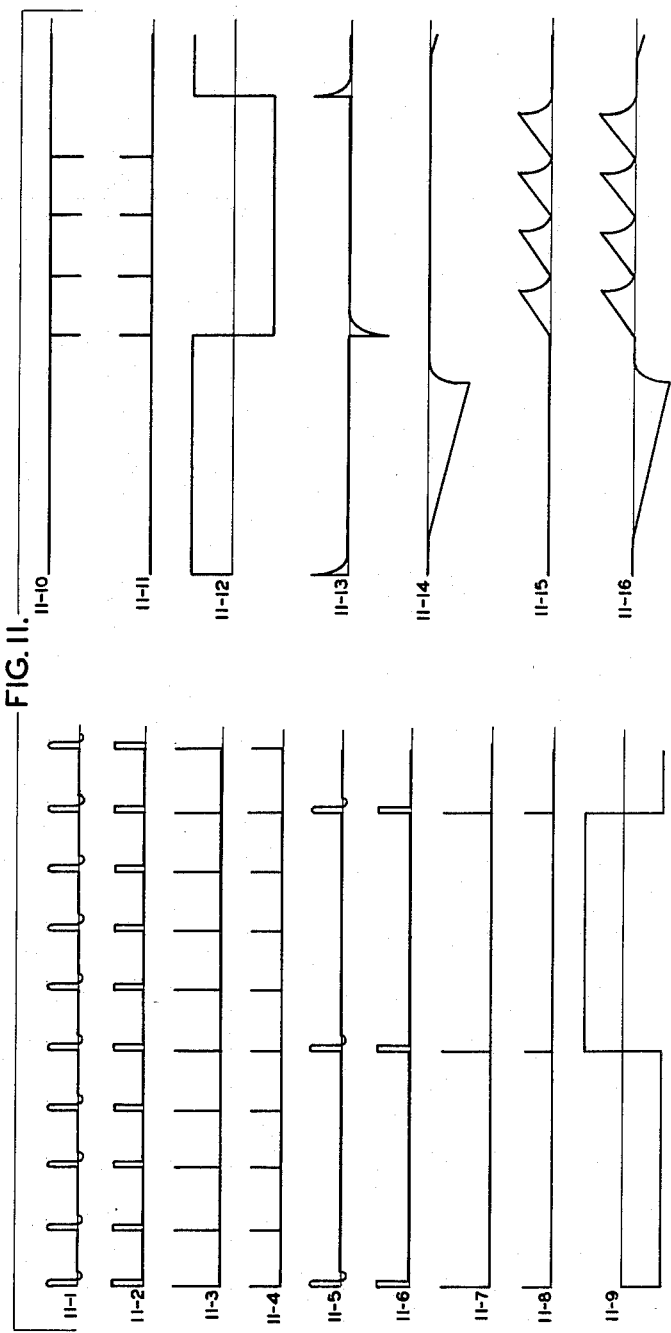

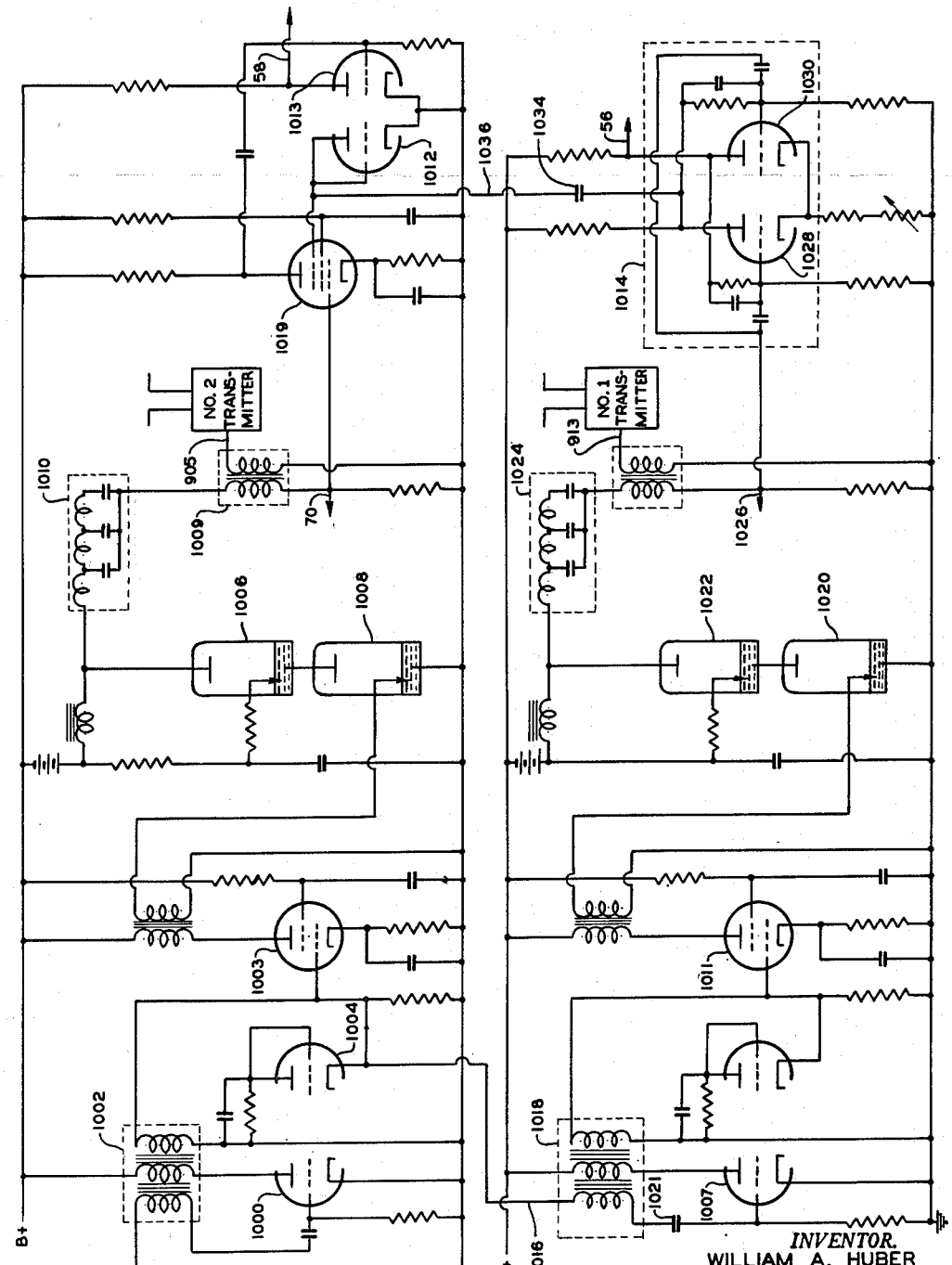

Jan. 27, 1953         W. A. HUBER ET AL         2,627,069
              DUAL SCANNING ANTENNA RADAR SYSTEM
Filed Jan. 6, 1945                              8 Sheets-Sheet 8
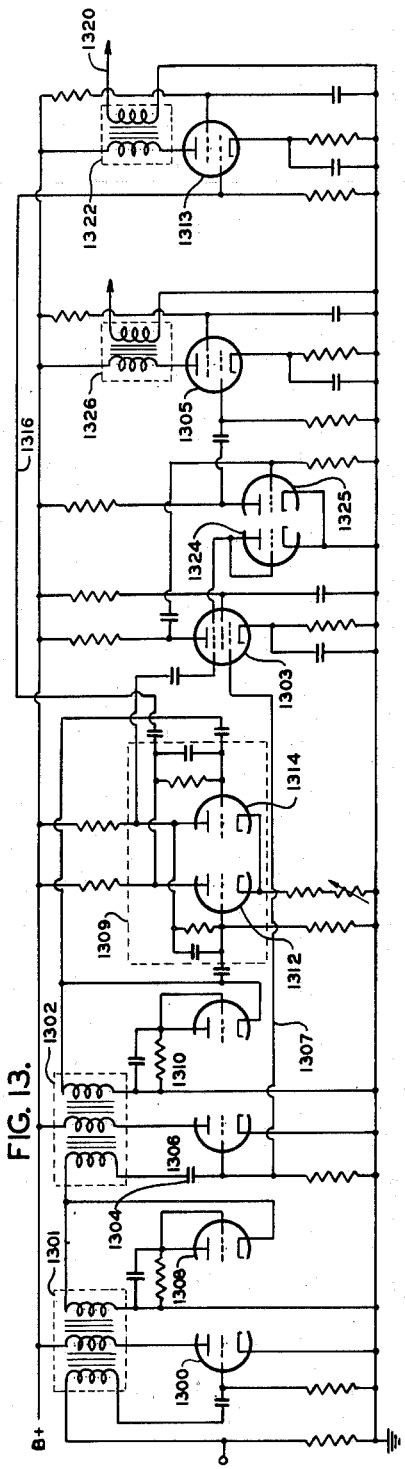
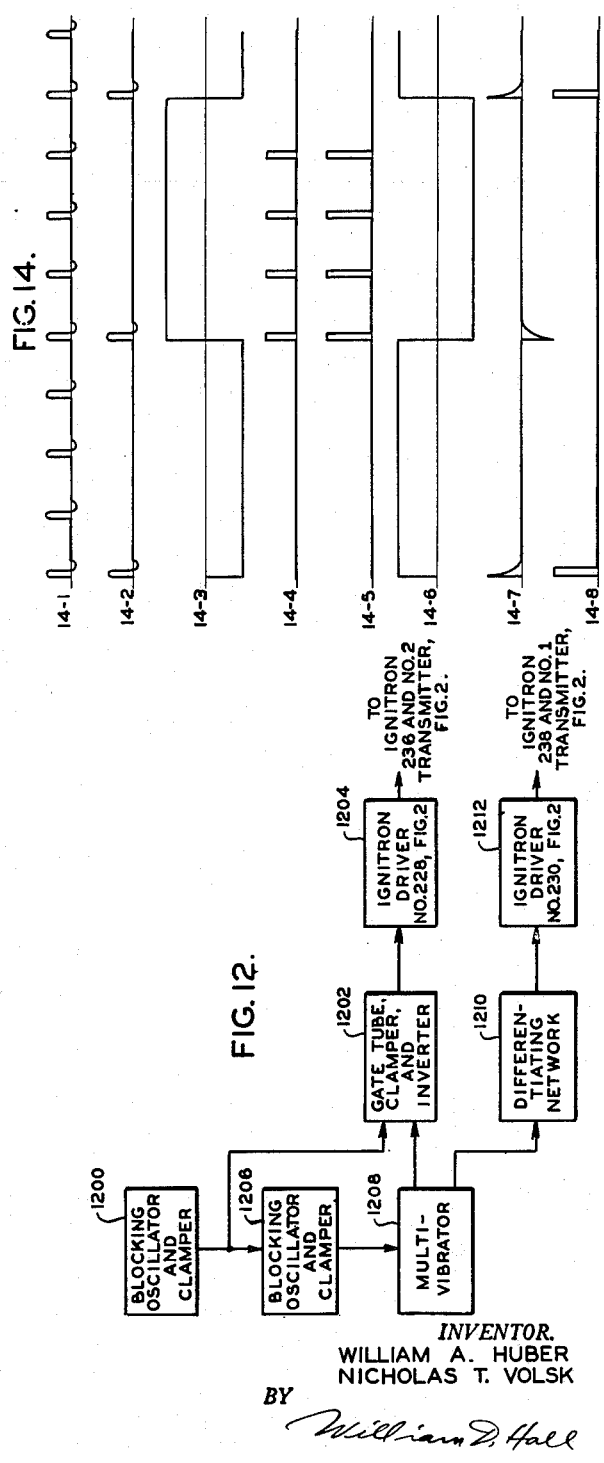
*INVENTOR.*
WILLIAM A. HUBER
NICHOLAS T. VOLSK
BY
*William D. Hall*
ATTORNEY Patented Jan. 27, 1953

2,627,069

UNITED STATES PATENT OFFICE 2,627,069

DUAL SCANNING ANTENNA RADAR SYSTEM

William A. Huber, Neptune, and Nicholas T. Volsk, Spring Lake, N. J., assignors to The United States of America as represented by the Secretary of War Application January 6, 1945, Serial No. 571,642

12 Claims. (Cl. 343—11)

(Granted under Title 35, U. S. Code (1952), sec. 266)

The invention described herein may be manufactured and used by or for the Government for governmental purposes, without the payment to us of any royalty thereon.

This invention relates to radio locators or radar, and, more particularly, to radio locators using a plurality of antennas for scanning the space under surveillance. The invention discloses a method and apparatus for reproducing images of echoes received by the antennas on a screen of a single plan position indicator, commonly known as P. P. I.

In an application for patent by William A. Huber, No. 543,745, filed July 6, 1944, titled "Radio System," a radar system is disclosed which is particularly suitable for surveillance of the space from the maximum obtainable range to the space directly above the radar station without any unscanned gaps or "dead space." As outlined in the above application, when radio locators are used for determining the position of airplanes in flight, because of high flying speeds of the airplanes, it is desirable to locate their presence and position as early, and as far away from the radio locators as practicable, and, after once locating them, to follow their course with the radio locator until they reach the locator itself, should their course of flight be such as to coincide with the position of the radio locator. An idealized scanning beam of a system of this type should then comprise a vertically positioned rectangle with the horizontal side equal to the maximum range obtainable, and the vertical side equal to the maximum altitude attainable by the airplanes. One lower corner of such imaginary rectangle should coincide with the position of the radio locator, which is the source of the scanning beam in the system of this type.

Since the state of the known art makes it impossible to obtain such scanning beam with a single antenna, the most practicable method of accomplishing this result consists of using two antennas, one antenna being adapted to radiate U. H. F., highly directional U. H. F. signals which form a first scanning energy lobe for obtaining the desired long range, and supplementing this long range lobe, or as it is sometimes called "an early warning lobe," with an additional "short range" lobe produced by the second antenna, which is adapted to radiate an ultra high frequency signal of preferably different frequency for filling in that portion of the imaginary rectangle which remained unscanned by the early warning lobe. The approximate shapes of the two antenna lobe patterns accomplishing this result are illustrated in Fig. 8, lobe 800 being an early warning lobe, and lobe 802 supplementing the early warning lobe by partially filling in the upper left corner of the imaginary rectangle 804.

The advantages of such arrangement reside in the faithful surveillance of space assigned to any particular radar station and optimum utilization of the obtainable lobe patterns and of available power, which results in minimum weight of the necessary equipment per unit of scanned area. Since the sought result may be obtained only with two antennas, it becomes necessary to consider the optimum mode of mounting them on a rotating vertical shaft and a supporting tower. Because of the size of the antenna reflectors, they offer considerable resistance to wind, this resistance being at a minimum when the two reflectors are mounted back-to-back, and the two lobes point in opposite directions, maximum wind loading and maximum degree of weight unbalance being encountered when the two antennas are mounted one above the other with both beams facing in the same direction.

As stated in the aforementioned application, the transmitting equipment in the radio locators of this type consists of a single modulator which keys simultaneously two transmitters, each transmitter being connected to its antenna, with the beam axes of the antennas pointing in the diametrically opposite direction. Two independent receiving-channels are used for reproducing the received echoes, the receivers being connected to the respective transmitting-receiving antennas through the duplexing circuits or "T-R boxes." Each receiver is connected on its output side to a plurality of auxiliary oscilloscopes and a P. P. I. oscilloscope, the latter reproducing the received echoes on its screen along a polar coordinate system with the radar station being located at the center of the polar coordinates. The position of targets is, therefore, indicated on the P. P. I. screens in terms of range and bearing. Except for the common modulator, the system, therefore, normally represents two complete transmitting-receiving channels. One of the reasons for using two separate oscilloscopes, one oscilloscope being connected to each receiver, is because of the desire to maintain the signal-to-noise ratio as high as possible. If the two receivers were connected in parallel to a single oscilloscope, the noise level impressed on a single oscilloscope would be approximately twice the noise level impressed on the oscilloscope by one receiver because of the law of random distribution of the noise signals. While the noise level would be thus doubled, the level of the useful echo signals would remain equal to the output level of one receiver because the lobe patterns of the two antennas overlap only to a limited extent, and because the amplitude limiting characteristics of the receiver would prevent any corresponding increase in the amplitudes of the useful signals. Accordingly, the known radio locators using two transmitting channels and two receiving channels for locating the objects also use two separate P. P. I. oscilloscopes, one oscilloscope for each channel, two operators to observe the location of the echo images on two separated screens, and some method of coordinating the information received individually by the two operators. One additional reason for using two separate P. P. I. oscilloscopes and continuous, simultaneous keying of the transmitters resides in the fact that the two P. P. I. oscilloscopes represent only a small fraction of the total number of the oscilloscopes connected to the receiving channels, the total number sometimes reaching as high a total as ten. This large number of the oscilloscopes becomes necessary when the air traffic reaches unprecedented proportions encountered during the "saturation raids." To avoid the resulting "saturation" and complete confusion at the radar stations, the polar coordinate system is subdivided into sectors, and each or some of the sectors are reproduced on several additional auxiliary oscilloscopes using type A, B and P presentations, or scans which reproduce the sectors on the expanded scales. During the "saturation raids," it is obvious that the two continuously operated transmitter-receiver channels offer a decided advantage over the radar systems operating with one scanning lobe, because of better available separation of targets. However, the emergencies of this type are, as a rule, of very short duration and occur very rarely so that during the overwhelming percentage of time the radar systems of this type are devoted to routine surveillance. When this is the case, the number of the oscilloscopes actually in use is ordinarily reduced to two, one full range P. P. I. oscilloscope for each lobe, and the previously mentioned application of Huber discloses a method and apparatus for reducing the number of the oscilloscopes used during such periods to one. When one P. P. I. oscilloscope is used with two antennas, the oscilloscope is provided with a "bi-radial sweep," which is two radial sweeps pointing in the opposite directions and taking place in alternate succession. The resulting screen image is illustrated in Fig. 7; it consists of two gradually fading-out sectors occupying diametrically opposite portions on the same screen. The advantage of such presentation resides in the fact that all echoes are reproduced on the same screen, thus enabling one operator to observe the entire field scanned by the two antennas. Reduction in the number of operators necessary during the surveillance periods and convenient coordination on one screen of the radar data furnished by the two lobes is the result.

The invention described in this specification relates to the improvement of the radar system disclosed in the previously identified application of Huber. In all previous systems, whether they use one or two P. P. I. oscilloscopes a single modulator is used for keying the two transmitters simultaneously so that two exploratory pulses are transmitted simultaneously in the opposite directions. During the saturation raid or any other heavy air traffic periods, with all oscilloscopes connected to the receiving channels, this mode of operating the transmitting channels is obviously the desired mode of operation; however, during the relatively quiet surveillance periods with the two receiving-channels connected only to a single bi-radial, P. P. I. oscilloscope, and the remaining oscilloscopes disconnected, simultaneous operation of the transmitting channels results in the loss of 50% of the transmitted power since signals from one receiver only are impressed on the bi-radial oscilloscope at any given time. In all radar systems the transmitting oscillator tube is one of the most expensive and short-lived links of the system, and such continuous operation of the transmitters shortens the life of the equipment, and increases its total weight. Although this disadvantage has been fully realized before, no attempt was made to key the transmitters alternately since the available high power modulators were as expensive, and as complicated and short-lived as the transmitting tubes, and doubling the number of the modulators for the sake of saving the power and the transmitting tubes hardly offered any advantage. The invention discloses a novel modulating channel, the simplicity of which makes the sought method of operation practicable.

Alternate keying of the transmitters makes it possible to obtain some additional advantages which are discussed below.

The following three equations define respectively the pulse energy, range index, and minimum detectable peak pulse:

The pulse energy:

$$E_t = P_t \tau \qquad (1)$$

where $E_t$ = pulse energy in joules, $P_t$ = peak pulse power in watts, (i. e., maximum amplitude of pulse)

$\tau$ = pulse width, (microseconds).

The range index, or maximum obtainable range, is defined by:

$$RI = 494.9 \; (E_t L_t L_r G_t' G_r' / F^2 \overline{NF})^{1/4}$$

$$\left[ \frac{K_1 \tau B}{4} \left( 1 + \frac{K_2}{\tau B} \right)^2 \right]^{1/4} F^{1/12} \qquad (2)$$

where $RI$ = range index, or maximum obtainable range in miles, $E_t$ = see Equation 1, $L_t$ = ratio of radiated energy to the transmitted pulse energy output, $L_r$ = ratio of available pulse energy at receiver terminals to the available pulse energy at the receiving antenna terminals, $G_t'$ = power gain of transmitting antenna, referred to a dipole, $G_r'$ = power gain of receiving antenna, referred to a dipole, $F$ = radio frequency in megacycles/sec., $\overline{NF}$ = receiver noise figure (as power ratio), $K_1$ = constant, depending upon type of presentation on the oscilloscope screen, rate of rotation, and width of the beam of the radar antenna, and type of detection, $B$ = band width ahead of the second detector in the receiver in cycles/sec., $K_2$ = constant, depending upon pulse shape.

The minimum detectable pulse is defined by:

$$P_{min} = \frac{1}{4}\left(1+\frac{1}{\tau B}\right)^2 \left(\frac{1640}{F}\right)^{1/3} \overline{NF} KTB \quad (3)$$

where $P_{min}$=minimum peak pulse power required for a just detectable pulse,
$F$=pulse recurrence frequency, (i. e., keying rate of transmitter),
$K$=Boltzmann's constant,
$T$=temperature in K°
[For definitions of $\tau$, $B$ and $\overline{NF}$ see Equation 2]

Examination of the above equations reveals, from the Equations 1 and 2, that the maximum obtainable range, RI, is a function of the amplitude and duration of the transmitted pulse. The minimum detectable pulse is also a function of the pulse width, $\tau$, and the rate of keying, F. For long range determinations, therefore, it is desirable to make the exploratory pulses of relatively long duration. However, when the length of the transmitted pulse is increased, the length or width of the received echoes is increased correspondingly, and in the "Class A" presentation it results in the generation of images possessing wider base; the result is that the images may interfere with each other, and, moreover, the precision of all range determinations is decreased with the increase of the length of the transmitted pulses because of the difficulty in determining the exact position of the peak of the wide pulse. On the P. P. I. oscilloscopes, the increase in the duration of the transmitted pulse results in the corresponding radial expansion of the echo images represented as arcs 114, 116 in Fig. 7, which produces the same detrimental effects, namely, Equation 3 states that the minimum detectable pulse, $P_{min}$, is a function of the keying rate, F, the detectable pulse requiring smaller pulse power, the higher is the keying rate. If, for better definition of targets on the oscilloscope screens, the transmitted pulses are made short, the minimum detectable pulse power may be increased, and if it is to remain constant the keying rate, F, must be increased. This is especially desirable in the extreme cases, when the short range lobe has an especially restricted radius as compared to the radius of the long range lobe. The keying rate of the long range lobe is determined largely by the time required for the transmitted pulse to reach the most distant object and for its echo to reach the receiver, and, as a result, it cannot be varied over wide limits; this is not the case with the short range channel. The invention discloses the transmitting-receiving channels where the long range transmitting channel is keyed at a slow rate, and the short range channel at a faster rate. Two systems of this type are disclosed; in one—the two transmitting channels are keyed continuously at two different respective rates, while in the other they are keyed at two different rates with the transmitters keyed alternately. In all cases the receiving channels are capable of reproducing the received signals on a bi-radial oscilloscope. Continuously keyed system is applicable to the locations where it is desirable to operate all oscilloscopes continuously, while the alternately keyed system is well suited for the locations where the auxiliary oscilloscopes are disconnected during the long routine surveillance periods.

In all disclosed systems the duration of the transmitted pulses in either channel may be adjusted at will without affecting the duration of the transmitted signal in the other channel.

The invention also discloses circuits for synchronizing the two sweep channels and a range marker channel with the two modulating channels.

Electronic switches are used for alternately blocking the video input circuits of the video channels connected to the bi-radial oscilloscope; this is still necessary, irrespective of whether the transmitters are keyed simultaneously or alternately; when the transmitters are keyed alternately, alternate blocking of the input circuits is necessary to avoid any decrease in the signal-to-noise ratio, while when the transmitters are keyed simultaneously, alternate blocking of the receivers becomes necessary to avoid the same decrease in the signal-to-noise ratio, and, in addition, to avoid confusion of signals on the oscilloscope screen.

It is, therefore, an object of this invention to provide a radio object-locating system having two transmitters with the transmitters keyed in alternate succession at equal rates.

It is another object of this invention to provide a radio-object-locating system having two transmitters with the transmitters keyed continuously at two different rates.

It is another object of this invention to provide a radio object-locating system of the above mentioned type in which one of the transmitters is keyed continuously at one rate, and the other transmitter is keyed continuously at a higher rate.

An additional object of this invention is to provide a radio object-locating system having two transmitters with the transmitters keyed in alternate succession, and with one transmitter keyed at a higher rate than the keying rate of the other transmitter.

Still another object of this invention is to provide a plan position indicator connected to two receiving channels of a radio locator having two transmitting channels keyed in alternate succession or simultaneously at two different rates, the circuits of the indicator being synchronized with the transmitting-channels so as to reproduce the signals from the two receiving channels on the screen of the indicator in terms of their true azimuth and equivalent range.

It is an additional object of this invention to provide a radio object-locating system having two transmitters in which one transmitter transmits exploratory pulses of one duration, and the other transmitter transmits exploratory pulses of shorter duration, the duration of the exploratory pulses being adjusted to produce optimum operating conditions in the respective transmitter-receiver channels.

The novel features which are believed to be characteristic of the invention are set forth in the appended claims; the invention itself, however, both as to its organization and methods of operation, together with the further objects and advantages thereof, may best be understood by reference to the further description in connection with the accompanying drawings, in which:

Figure 2 is a schematic diagram of the modulating channel;

Figure 3 shows the relation of Figs. 4 and 5 with respect to each other;

Figure 7 illustrates the screen of an oscilloscope tube and the images produced upon it by the echo and marker signals, and Figure 8 illustrates the approximate shapes of the antenna lobes of the two back-to-back antennas illustrated in Fig. 1.

Figures 9 and 10 are the block and schematic diagrams respectively of the modulating and synchronizing channels of that radar system in which the transmitters are keyed continuously at two different rates;

Figures 12 and 13 are the block and schematic diagrams, respectively, of the modulating channels and synchronizing connections of the radar where the two transmitters are keyed alternately at two different rates.

Figures 11 and 14 are the oscillograms of signals encountered in the circuits of the Figs. 10 and 13 respectively.

Figure 1:
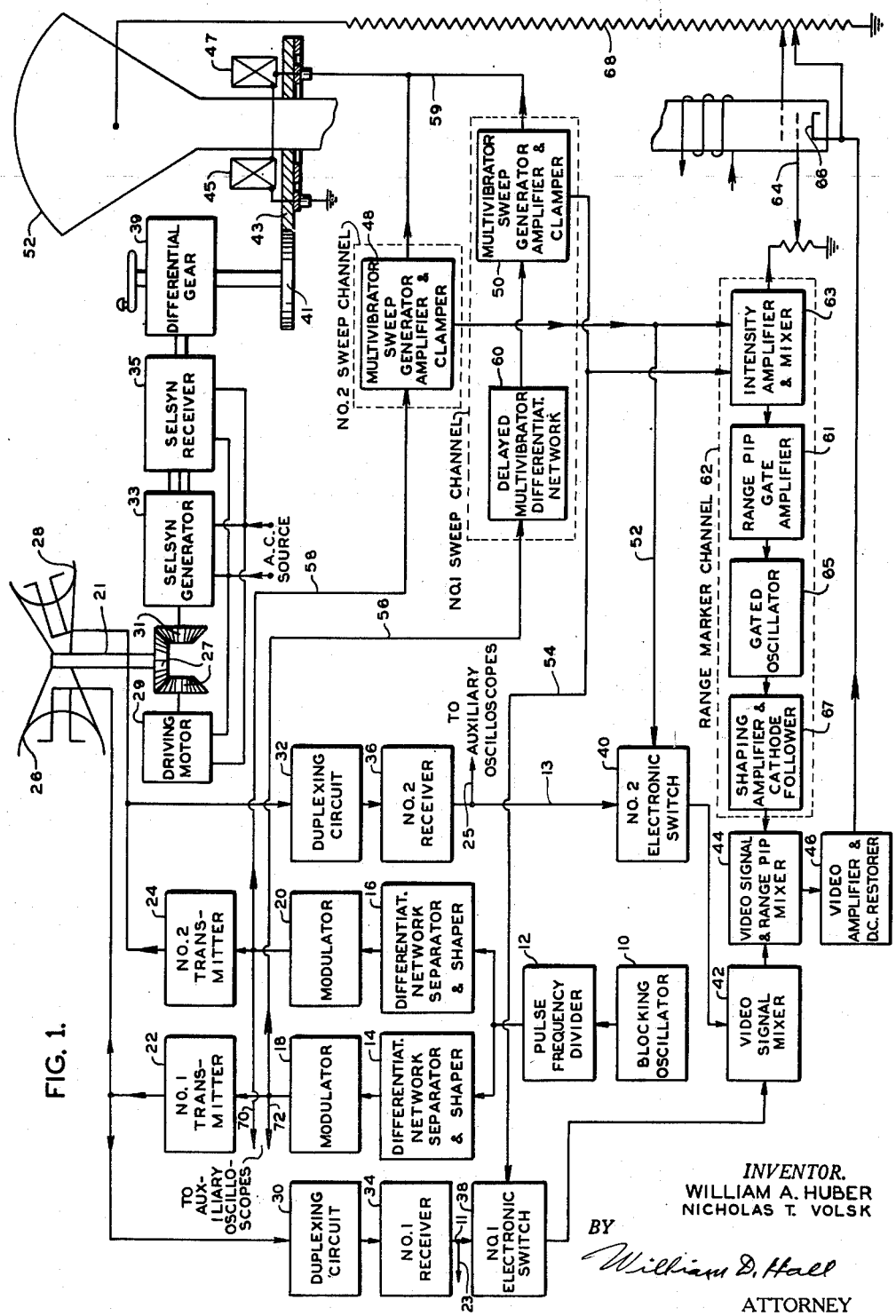
Figure 1 is a block diagram of a dual antenna radio locator connected to a bi-radial sweep oscilloscope.

Referring to Fig. 1, the transmitting channel appears in the left portion of the diagram beginning at a blocking oscillator 10 and terminating at the transmitting and receiving antennas 26, 28. The No. 1 receiver is to the left of No. 1 transmitter, and No. 2 receiver is to the right of No. 2 transmitter. The marker channel and the video channel are in the lower portion, while the two sweep channels are in the central, right portion of the figure. The P. P. I. oscilloscope tube 52 is connected to the video and sweep channels. The antennas are rotated by means of a driving motor 29, which is also used for synchronously rotating the yoke coils 45—47 of the cathode ray tube.

Figure 4:
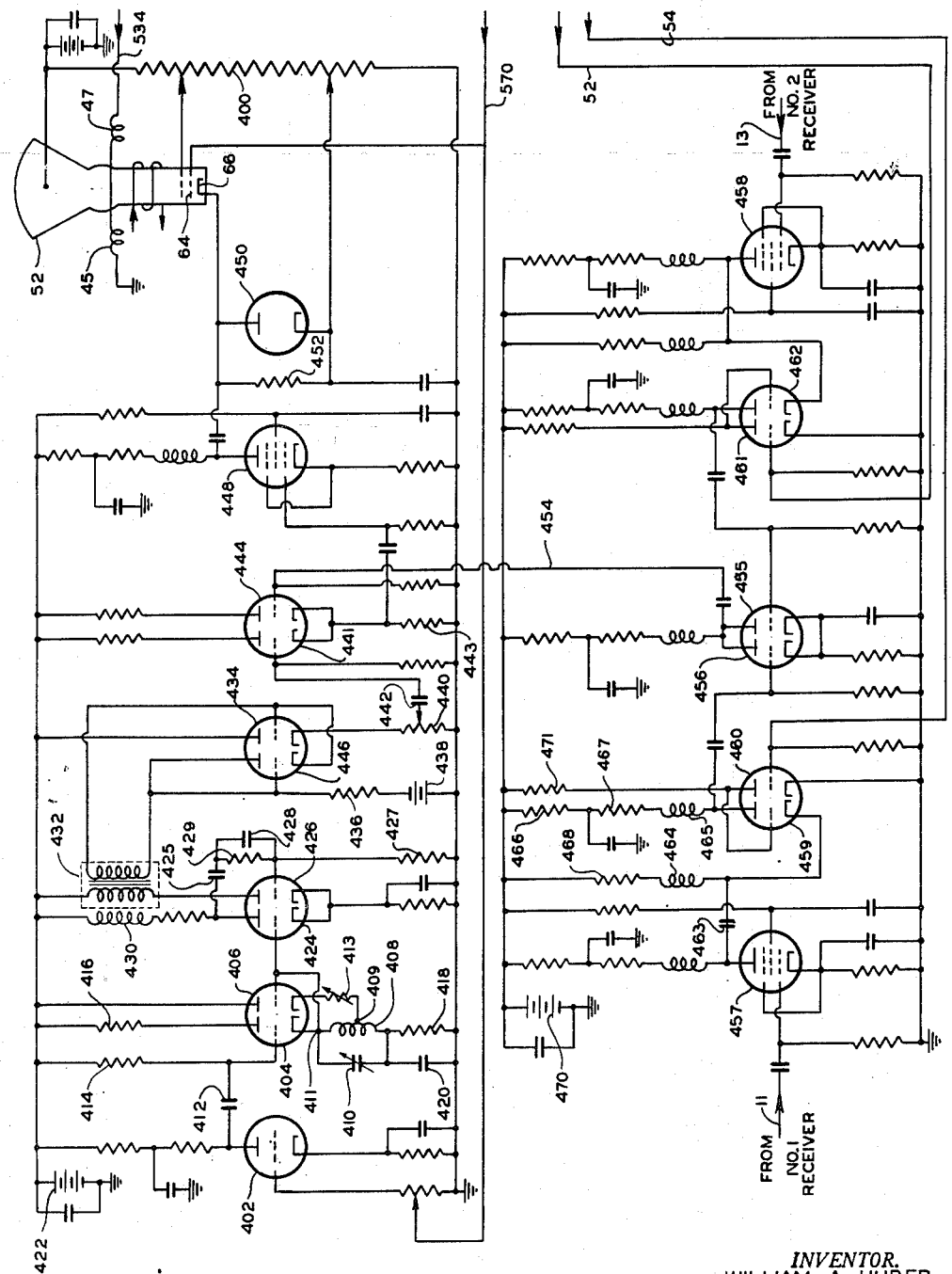
Figures 4 and 5 are the schematic diagrams of the range marked channel, video channels, electronic switches, and two sweep channels.

Proceeding with a more detailed description of the blocking diagram, blocking oscillator 10 is connected to a pulse frequency divider 12. The oscillator generates a continuous series of periodic pulses 6—1, Fig. 6, which are so spaced as to give the desired keying rate of the transmatters. Pulse frequency divider consists of a D. C. restorer and Eccles-Jordan multivibrator which impresses the two 180° out-of-phase, rectangular waves 6—2 and 6—12 on two networks 14 and 16, respectively. These transform the rectangular waves into short pulses 6—5 and 6—14, one series of pulses being used for timing the keying rate of transmitter No. 1, while the other—for timing the keying rate of transmitter No. 2. Network 14 impresses its output 6—5 on a modulator 18 consisting of a pulse amplifier which controls the ionization of two serially-connected ignitrons. The ignitrons, upon their ionization, discharge an artificial line, and it is this discharge pulse 6—6 that is used for supplying the plate potential for an oscillator in transmitter No. 1. The length of the transmitted pulse is controlled by adjusting the parameters of the artificial line. The same circuits, consisting of a modulator 20 and transmitter 24, are used for generating the exploratory pulses in the second transmitting channel. Plane-polarized, highly directional antennas 26 and 28 are used for projecting into space the radiated energy. The lobe patterns of one system giving satisfactory results are illustrated in Fig. 8, as mentioned previously. The lobe axes of the antennas point in the diametrically opposite azimuth directions so that there is a horizontal angle of 180° between the axis of one lobe and the axis of the other. Antenna 28 is tilted upward to produce the short-range lobe 802, Fig. 8. The antennas are mounted on a vertical shaft 21 which is connected by gears 27 to a driving motor 29, and by a gear 31 to a "Selsyn" generator 33. The stator winding of the "Selsyn" generator is connected to the stator winding of a "Selsyn" receiver 35. Shaft 37 of the latter is connected through a differential gear 39 and a driving gear 41 to a driven gear 43. The deflection coils 45, 47 of the P. P. I. oscilloscope tube 52 are secured to gear 43, which is mounted by means of ball-bearings and an appropriate collar on the neck of the oscilloscope tube. The differential gear 39 is used for the initial alignment of the electromagnetic axis of the deflection coils 45, 47 so that their magnetic axis is parallel with the axes of the antenna beams. The "Selsyns" revolve the deflection coils in synchronism with the rotation of the antennas which insures proper azimuth indications on the screen of the oscilloscope tube 52. The driving motor and the "Selsyns" are all connected to a common source of alternating current in a conventional manner, as indicated in the figure. It is preferable to use different frequencies for obtaining the illustrated lobe patterns, and for avoiding the interchannel interference, but the described invention is not limited to the system using different transmitting frequencies, and will function when the two frequencies are equal. The receiving channels consist of duplexing circuits 30 and 32, super-heterodyne receivers 34 and 36, electronic switches 38 and 40, video signal mixer 42, a video signal and range pip mixer 44, and a video amplifier and D. C. restorer 46. The functioning of the duplexing circuits, otherwise known as T—R switches, in the radar systems is well-known and is described in detail on pages 195–209 of Radar System Fundamentals, Navships 900,017, published by the Bureau of Ships, Navy Department, April 1944. The receivers and their circuits are well-known in the art and need no detailed description or reference. An ultra high frequency heterodyne receiver is suitable for the contemplated purpose. The same is true of the transmitters, antennas and the "Selsyn" drives 29, 33 and 35. The remaining circuits will be described more fully in connection with the description of the schematic diagrams illustrated in the Figs. 2, 4 and 5.

The reason for the interposition of the electronic switches 38 and 40 between the receivers and the video signal mixer 42, as mentioned previously, is to prevent lowering of the signal-to-noise ratio in the video channels by blocking the output of the inoperative receiving-channel. The connections and the circuits of these switches will be described more fully later in connection with the description of the Figs. 3 and 4. Suffice it to say at this instant that the switches alternately block the outputs of the receivers so that only the active channel impresses the video signals on the P. P. I. oscilloscope. The electronic switches derive the keying pulses from multivibrators 48 and 50 to which they are connected over conductors 52 and 54. Each multivibrator represents a component part of a sweep channel, two channels being used for generating two saw-tooth waves 6—19, Fig. 6 which produce the bi-radial sweep. The modulators 18 and 20 keep, through conductors 56 and 58, the respective multivibrators in constant synchronism with the transmitted exploratory pulses. No. 1 sweep channel includes a delayed multivibrator 60, a sweep generator, an amplifier, and a clamper

50, the output of the amplifier being connected over a conductor 59 to the deflection coils 45 and 47. The saw-tooth wave 6—11, generated by No. 1 sweep channel, is used for reproducing the echo signals received by the long range antenna 26. The No. 2 sweep channel includes a multivibrator - sweep - generator - amplifier-clamper circuit 48 connected to the deflection coils over conductor 59. The saw-tooth wave 6—18 generated by this channel is used for reproducing the echo signals received by the short range antenna 28. An additional delayed multivibrator and differentiating network 60 are used in No. 1 sweep channel for delaying the generation of the saw-tooth wave 6—11 by the circuits included in block 50 for a sufficient length of time, so that only the desired remote portion of the long range is reproduced on the oscilloscope screen. The outputs of the multivibrators 48 and 50, besides being connected to the electronic switches over conductors 52, 54, are also connected to a range marker channel 62 which includes an intensity amplifier and mixer 63, a range pip gate amplifier 61, a gated oscillator 65, and a shaping amplifier and cathode follower 67, the latter being connected to the video signal and range pip mixer 44. The two rectangular waves are combined in mixer 63 and are impressed as positive signals 6—22 on the accelerating grid 64 for overcoming, during the duty cycles of the respective receivers, the positive blocking potential normally impressed on cathode 66 by a bleeder resistor 68. The two rectangular waves 6—22 are also used for unblocking the gated oscillator 65, whose output is transformed by the shaping amplifier and cathode follower 67 into a series of short rectangular pulses 6—25, which are used as the range markers in the oscilloscope tube.

Summarizing briefly the operation of the radio locator illustrated in Fig. 1, the antennas 26 and 28 and the deflection coils 45 and 47 are rotated at the same angular velocity by means of driving motor 29 and the "Selsyns" 33, 35. Two modulators 18 and 20 alternately key the No. 1 and No. 2 transmitters which radiate, in alternate succession, the exploratory pulses in two diametrically opposite directions. The rotational speed of the antennas, as a rule, is so low as compared to the rate of keying of the transmitters that the alternate radial sweeps produced by the saw-tooth waves 6—19 appearing in the outputs of the No. 1 and No. 2 sweep channels, represent a substantially straight line 700—702—704, Fig. 7 on the oscilloscope screen. The received signals are impressed on the No. 1 and No. 2 receivers respectively, the electronic switches 38 and 40 normally blocking the outputs of the receivers, except during their respective duty cycles.

The electronic switches are synchronized with the sweep channels, preventing any decrease in the signal-to-noise ratio and making it possible to reproduce the signals from No. 1 receiver along one radio sweep, and the signals from the other receiver along the other sweep, the two sweeps pointing in the direction of the respective lobe axes so that the true azimuth location of the object, as well as its range, are reproduced on the oscilloscope screen.

The duty cycle of No. 1 receiver does not normally begin simultaneously with the transmission of the exploratory pulse, but is delayed so that only the desired outlying portion of the full range is reproduced along the long range sweep, delayed multivibrator 60 being used for selecting the desired portion of the full range. The duty cycle of No. 2 receiver begins with the transmission of the exploratory pulse and extends to the maximum range of the short range lobe 802, Fig. 8. The auxiliary oscilloscopes connected to the receivers over the conductors 23 and 25 may be connected and disconnected from the receivers without affecting the operation of the bi-radial P. P. I. oscilloscope.

Figure 6:
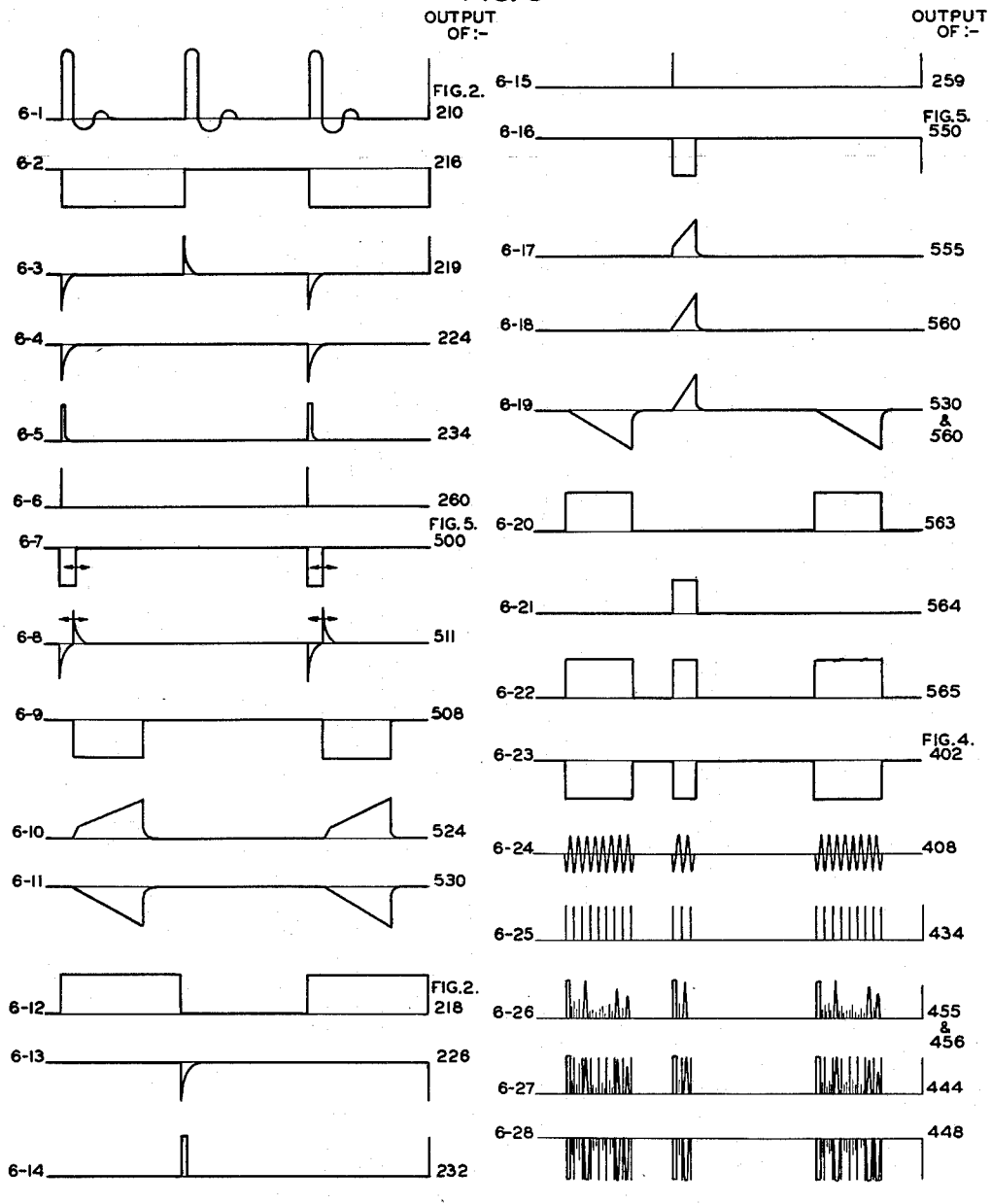
Figure 6 illustrates the oscillograms of the waves normally appearing in the circuits shown in the Figs. 2, 4 and 5.

Proceeding with the description of the schematic diagram of the transmitting channel shown in Fig. 2, a blocking oscillator 210 generates a continuous series of pulses 6—1 illustrated in Figs. 2 and 6, the signals in Fig. 6 appearing in their true phase relationships. Because of the limited space available in the drawing, the actual duration of the signals could not be faithfully illustrated in Fig. 6; however, the approximate waveform of the signals is fairly well represented in the figure. The functioning and connections of the blocking oscillator are known and need no detailed description. (See pp. 255–260, Electron Optics in Television, by Maloff, et al.—1938.) Blocking of oscillations is accomplished by a negative biassing potential impressed on the grid of the oscillator by a condenser 211, which collects a negative charge when the grid draws current during that portion of the oscillatory cycle which makes the oscillator conductive. The duration of the blocking cycle is determined by the time constant of the R.-C. combination 209—211—213 in the grid circuit of the oscillator. The stability of the blocking oscillator is adequate for the purpose because of synchronization of the receivers with the outputs of the modulators. The blocking oscillator is coupled to a D. C. restorer 214 and a multivibrator 216—218 by means of an iron-core pulse transformer 216, the D. C. restorer eliminating the negative halves of the oscillatory cycles so that only the positive signals are impressed on the grids of the multivibrator. The latter is of the modified Eccles-Jordan type which has two degrees of stability, obtainable by impressing either a positive or a negative signal on the grids of the tubes. Substantially rectangular waves 6—2 and 6—12 appearing in the plate circuits of the triodes are impressed on the differentiating networks 219—220 and 221—222 connected to the cathodes of the diodes, the diodes selecting the negative pulses and suppressing the positive halves as illustrated at 6—3, 6—4 and 6—13. The phase relationship of these signals is clearly illustrated in Fig. 6 which reveals the fact that diode 224 produces a series of negative pulses 6—4 corresponding to the odd pulses generated by the blocking oscillator, while diode 226 produces a series of negative pulses 6—13 corresponding to the even pulses of the same oscillator. Accordingly, the function performed by the circuits, which are connected between the blocking oscillator 210 and power amplifiers 228 and 230, is to separate the pulses generated by the blocking oscillator, and to direct every other pulse to amplifier 228 and the remaining alternate pulses to amplifier 230. Such selection of pulses results in the alternate keying of the No. 1 and No. 2 transmitters. The selected negative pulses 6—4 and 6—13 are impressed respectively on the control grids of the beam type power amplifiers 228 and 230 which are normally conductive. The negative pulses over-drive the beam tubes in the negative direction so that positive rectangular pulses 6—5 and 6—14 appear in the plate circuits and in the secondaries of the pulse transformers 232 and 234. The secondary of transformer 232 is connected in series with the ignitor-cathode circuit of an ignitron 236. The power delivered by the secondary of the transformer is sufficient to establish hot spot on the surface of the mercury pool in the ignitron, and, since the anode of the ignitron is connected to the positive terminal of a source of potential 239, through resistors 241 and 242, and a normally positively charged condenser 245, ignitron 236 becomes immediately conductive, the fully charged condenser 245 discharging through the ignitor-cathode circuit of ignitron 250 connected in series with ignitron 236. The charge accumulated on condenser 245 is of sufficient quantity for producing hot spot on the mercury pool of ignitron 250 with the result that ignitron 250 becomes also conductive because of the positive charge accumulated on condensers 253 of an artificial line 254, the plate of ignitron 250 being connected to the junction point between the artificial line and a choke coil 257. When the discharge of condenser 245 establishes hot spot on the cathode surface of ignitron 250, the fully charged artificial line 254 discharges through the series circuit formed by the two ignitrons 250, 236 and the primary of a transformer 259. The time constant of the artificial line 254 is adjusted to produce a pulse of the desired duration in the primary of transformer 259 for obtaining optimum operating conditions in the short range transmitting-receiving channels as discussed previously. A choke coil 257 is used for increasing the voltage impressed on the artificial line 254 during its charging periods, the two forming a series resonant circuit. Accordingly, when the charging period of the artificial line begins, the current flows through the inductance coil and, because of the stored energy in the iron-core choke coil, the maximum voltage that is impressed on the artificial line during the first half of the oscillatory cycle is in the order of twice the voltage of source 239. Because of high inductance of choke coil 257 which may be of the order of 100-200 henrys, the value of the selected inductance depending upon the keying rate and the time constant of the artificial line, the duration of the oscillatory cycle of the choke-coil-artificial-line combination may be of the order of 2000 microseconds. Since this value is much larger than any possible variation or "jitter" that may be encountered in the circuits connected to the ignitrons, which is of the order of a fraction of one microsecond, positive synchronization of the artificial-line-choke-coil oscillatory circuit with the blocking oscillator 210 is unnecessary, the ionizing pulses impressed on ignitron 236 always discharging the artificial line when the accumulated charge reaches its substantial maximum value. The value of resistance 241, which is a high resistance, is selected so as to isolate ignitron 236 from source 239 after the artificial line has been fully discharged. The IR drop across resistance 241 and the inductance of coil 257 are so large that the ignitrons 236 and 250 become deionized after the discharge of the line. Resistance 242 is a low resistance and is used for controlling the rate of discharge of condenser 245; this protects the ignitor electrode of ignitron 250 from carrying excessively heavy currents during the ionizing periods of ignitron 250. The functioning of ignitrons 238, 252 and their circuits, including a condenser 246, resistances 243, 244, choke coil 258, and an artificial line 256 in the No. 2 modulator is identical to the functioning of the corresponding elements in the No. 1 modulator. For a more detailed description of the ignitron circuits, reference is made to the application for patent of Irving Sager, titled "Line Pulse Modulator," Serial No. 543,741, filed July 6, 1944, now Patent No. 2,533,285 dated December 12, 1950. The pulses produced by the discharge of the artificial lines are impressed on the pulse transformers 259 and 260, the secondaries of which are connected in series with the plate circuits of the oscillators of the No. 1 and No. 2 transmitters, the secondaries of the transformer furnishing the necessary plate voltage for the oscillators.

The pulses impressed on the primaries of the transformers 259 and 260 are illustrated at 6—6 and 6—15 in Fig. 6, and it is these pulses that are used for synchronizing the operation of the receiving channels with the transmitting channels. This synchronization is obtained by connecting the primaries of the transformers 259 and 260 over the conductors 56 and 58 to the multivibrator circuits 48 and 60, Fig. 1, thus, synchronizing the generation of the saw-tooth waves by the No. 1 and No. 2 sweep channels, operation of the No. 1 and 2 electronic switches, and periodical unblocking of the cathode ray tube and of the range marker channel with the transmitted pulses. The schematic diagram of the enumerated circuits is shown in the Figs. 4 and 5; the relationship of these figures with respect to each other being shown in Fig. 3.

Figure 5:
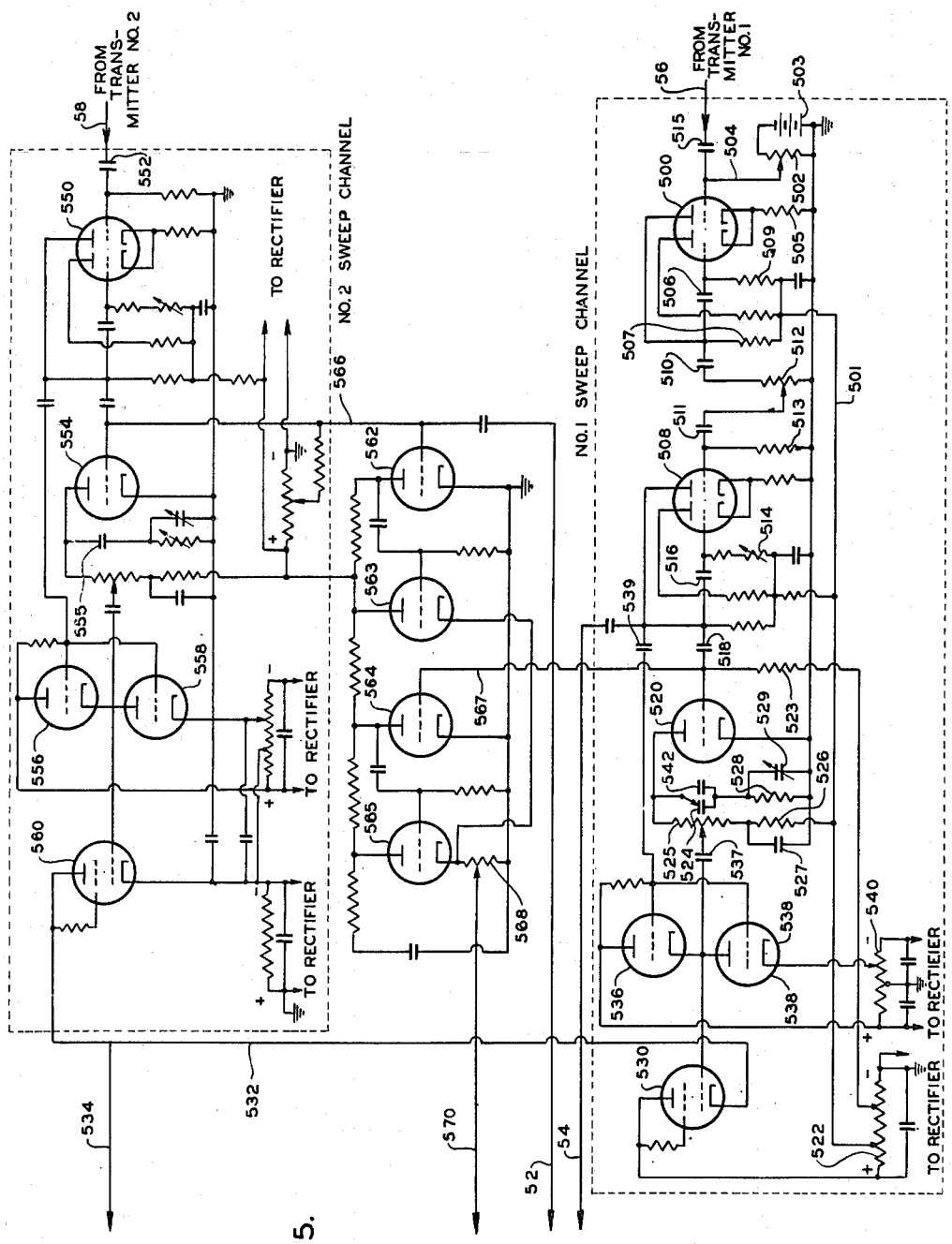

Proceeding now with the description of the circuits of the No. 1 and 2 sweep channels shown in the upper and lower portions of Fig. 5, the modulating pulses are impressed over conductors 56 and 58 appearing in the right portion of Fig. 5 on two multivibrators 500 and 550 respectively. Double triode 500 represents a delayed multivibrator used for delaying the generation of the saw-tooth wave in the No. 2 sweep channel. Normally, the left half of triode 500 is fully conductive because of the source of plate potential impressed on its grid by a bleeder resistor 522 over a conductor 501, the grid drawing a small grid current. Because of the IR drop in a common cathode resistor 505 and the negative biasing potential impressed by a biassing battery 503 through a potentiometer 502, the right half of triode 500 is normally non-conductive. When a positive pulse is impressed on the right grid by conductor 56, the right triode is made conductive and the left triode non-conductive because of the grid of the left triode which is driven below the new cathode potential by the IR drop in a plate resistor 507. Condenser 506 discharges across the resistances 507 and 509, and the grid potential of the left triode rises to the point at which the left triode begins to conduct. At this point, because of the increased IR drop across resistor 505, the right triode is cut off and the multivibrator returns to its normal condition with the left side being conductive and the right side non-conductive. The change occurs very rapidly in a regenerative fashion with the result that a rectangular wave 6—7 of adjustable width is generated across resistance 507, the width of the rectangular pulse being a linear function of the bias impressed on the right half of twin triode 500 by potentiometer 502.

By adjusting the setting of potentiometer arm 504, it is possible to vary the width of the rectangular wave 6—7 which in turn varies the degree of delay produced in generating the sawtooth wave by No. 1 sweep channel, and it is the occurrence of the latter that determines which portion of the long range is reproduced on the oscilloscope screen. The rectangular pulse 6—7 is impressed on a multivibrator 508 over condensers 510—511 and a potentiometer 512, condenser 511 in combination with the grid resistor 513 comprising a differentiating network interconnecting the two multivibrators. The rectangular wave 6—7 is differentiated by this network as illustrated at 6—8 and the resulting positive pulse is used for controlling the instant of triggering of the delayed multivibrator 508, the negative pulse having no effect on the normally non-conductive right half of 508. The functioning of the delayed multivibrator 508 is identical to the functioning of the delayed multivibrator 500 except that the normal bias impressed on the control grid of the right half of twin triode 508 remains fixed, while the time constant of the resistance-condenser combination 514—516 is made adjustable for controlling the width of the rectangular wave 6—9 generated by this multivibrator. It is the duration of this rectangular wave that determines the duration of the linear portion of the No. 1 sweep. Therefore, the multivibrators 500 and 508 are adjusted so that the duration of the rectangular wave 6—9 corresponds to the range whose reproduction is desired on the oscilloscope screen. When it is desirable to reproduce the full range, the necessity for having the first multivibrator 500 disappears altogether and the signals from modulator 18 may be impressed directly on the right grid of twin triode 508. Since the dimensions of the oscilloscope screen remain fixed, full reproduction of the range is possible only when elimination of multivibrator 500 is also accompanied by the adjustment of the resistance-condenser combination 524—525 of a saw-tooth generator 520 so that the sweep is made sufficiently slow for including the entire range of the system. This will be mentioned once more in connection with the description of the circuit of saw-tooth generator 520. The rectangular wave 6—9 appearing in the output of the right half of twin triode 508 is impressed by a condenser 518 on the grid of a triode 520 which comprises a "single-ended" saw-tooth oscillator of the No. 1 sweep channel. The grid of triode 520 is connected to a bleeder resistor 522 which impresses a positive potential on the grid through a grid resistor 523; therefore, triode 520 is normally conductive so that the sweep-generating condenser 524 is normally kept in a substantially discharged condition. The plate of triode 520 is connected to the positive source of potential 522 through a plate resistor 525 and an isolating resistor 526, the latter being shunted to ground by a by-pass condenser 527. The saw-tooth generating condenser 524 is grounded on the other side through a resistance 528 and adjustable condenser 529. This resistance and condenser combination is used for adjusting the initial wave front of the voltage wave 6—10 so as to produce a linear current wave 6—11 in the deflection coils 45 and 47 of the oscilloscope. It has been previously mentioned that in order to reproduce the full early-warning range elimination of the precision delayed multivibrator 500 must be accompanied by the adjustment of the slope of the saw-tooth wave 6—11 so that this wave will reach the same maximum amplitude after a longer charging period of condenser 524. The sought result may be accomplished by providing an auxiliary condenser 542 which may be substituted in place of condenser 524 for this purpose. The voltage wave 6—10 is impressed on a power amplifier 530, the cathode of which is connected to ground 400, Fig. 4, through conductors 532, 534 and deflection coils 47 and 45. The clamper circuit, including triodes 536 and 538, is connected to the grid of the power amplifier tetrode 530, the serially connected triodes 536 and 538 keeping the control grid of tetrode 530 at constant potential above ground during the inactive periods of the tetrode. This function is performed by the clamper circuit in the following manner: the two tubes act, when conductive, as two variable, unidirectional resistances connecting the control grid of tetrode 530 to a grounded tap on a bleeder resistance 540. The grid potential normally impressed on the power amplifier 530 by resistor 540 through the partially conductive triodes 538 and 536 renders it non-conductive, the stability of this potential being controlled by stability of the potential appearing across bleeder resistor 540 and the stability of the triodes 536 and 538. During the charging period of condenser 524, a negative potential is impressed on the grids of the triodes 536 and 538 by multivibrator 508 over a coupling condenser 539 making triodes 536 and 538 only slightly or totally non-conductive; therefore, the clamping circuit acts as a high grid resistor at this instance, tetrode 530 amplifying the signal impressed upon it by the saw-tooth generator through condenser 537. When the negative cycle of rectangular wave 6—9 is over, the triodes 536 and 538 become conductive, their conductivities being controlled at this instance by the potentials impressed upon their plates and grids by the bleeder resistor 540. The biassing of power amplifier 530 at this instant is performed mainly by the conductivity of triode 538 which may be regulated by adjusting the connection of the cathode of this tube on the bleeder resistor 540. A negative biassing potential is impressed on the power amplifier at this instant by triode 538 because the cathode of the latter is connected to that portion of the bleeder resistor 540 which is below the ground potential.

Referring now to No. 2 sweep channel, the modulating pulses from modulator 20 are impressed on the grid of a double triode 550 over conductor 58 and a coupling condenser 552. Since this channel generates a current wave 6—18 for reproducing the signals received by the short range channel, it is obvious that there is no necessity of delaying the generation of this sweep, and, consequently, no reason for having an additional delayed multivibrator, such as multivibrator 500 used in No. 1 sweep channel. Therefore, the modulating signals are impressed directly on the delayed multivibrator 550, the function of which corresponds to multivibrator 508 in the No. 1 sweep channel. The remaining elements included in the No. 2 sweep channel are identical to the corresponding elements in No. 1 channel: they included a saw-tooth generator 554, clamper tubes 556 and 558, and a power amplifier 560 which impresses the current saw-tooth wave 6—18 on the deflection coils of the oscilloscope, the radial vectors 700—702 and 700—704, Fig. 7 are equal, the saw-tooth waves 6—11 and 6—18 have equal maximum amplitudes, but wave 6—18 reaches this maximum much faster than wave 6—11. Hence the short range signals are reproduced along an "expanded" sweep, as it may be seen in Fig. 7 where a much larger number of the marker signals appears along the long range sweep 700—702 as compared to the number of markers appearing along the short range sweep 700—704. The combined current saw-tooth waves impressed on the deflection coils are illustrated at 6—19, and the image pattern appearing on the oscilloscope screen is illustrated in Fig. 7, the markers appearing as bright dots 710, 712, and the echoes as short arcs 714, 716, etc.

It has been previously mentioned that cathode 66 of the cathode ray tube 52 is positively biassed so that the tube is normally blocked. To overcome this blocking potential during the duty cycles of the respective receivers, two positive rectangular waves illustrated at 6—22 are impressed on the accelerating grid 64 of the tube, thus, overcoming the cathode positive blocking potential. These rectangular waves are obtained by combining the outputs of the multivibrators 508 and 550 in the intensity amplifier and mixer, including triodes 562, 563, 564, 565, the latter being the mixer stage of the combination. The grids of the inverting and isolating amplifiers 562 and 564 are connected to the outputs of the previously mentioned multivibrators over conductors 566 and 567, respectively, a rectangular wave 6—9 being impressed on triode 564, and rectangular wave 6—16 on triode 562. The output of the latter, is combined in a cathode resistor 568 of the triodes 563 and 565. The resulting combined signal 6—22 appearing across cathode resistor 568 is impressed on the intensity grid 64 over conductor 570. The same combined signal 6—22 is also impressed on the input stage 402 of the marker channel which synchronizes the operation of the latter with the duty cycles of the two receiving channels. Since the rectangular waves 6—22 are positive they are inverted in an inverter 402, and the negative waves 6—23 are used for synchronizing the operation of the pulse oscillator which includes twin triodes 404, 406 and their circuits.

These circuits include a resonant inductance-capacity circuit 408—410, a resistance 413 connected to the cathode of triode 406 on one side and to the midpoint 409 on inductance 408, a coupling condenser 412, a grid resistor 414, a plate resistor 416, a cathode resistor 418, and a by-pass condenser 420 connected across resistance 418. Resistance 414 connects the grid of triode 404 to a source of plate potential 422, the latter being also connected to the plates of the twin triode. The cathode of triode 404 and the grids of the triodes 424, 406 are connected to the tank circuit at the junction point 411, and the tank circuit is grounded through resistance 418. The operation of the pulse oscillator is as follows: initially, triode 404 is fully conductive since its grid is directly connected to the source of positive potential 422. At this instant the conductivity of triode 406 is controlled by the IR drops in the resistances 418, 413 and the lower half of coil 408, this drop determining the cathode potential of triode 406, and the IR drop in resistance 418 and coil 408 which determines the potential of the grid of triode 406. When the negative rectangular waves 6—23 are impressed on the grid of triode 404 through condenser 412, these waves being started by the transmitted exploratory pulses or by the keying pulses generated by the keyers, triode 404 is rendered non-conductive. The interruption of the space current normally flowing through inductance 408 results in shock excitation of the L.-C. circuit 408—410 which generates a damped oscillatory wave, the period of which is determined by the period of the L.-C. circuit.

Because of the loss encountered in inductance 408 and condenser 410, the damp oscillations would normally decay to zero amplitude, and in order to prevent this they are impressed on the grid of triode 406 which acts as a "Class A" amplifier of the oscillations. Triode 406 feeds back to the L.-C. circuit enough energy to counteract the losses with the result that undamped oscillations are impressed on the grid of the shaping amplifier 424. The circuit of triode 406 is that of a cathode follower, the load of which consists of resistance 413 in series with the equivalent impedance seen looking into inductance 408 at point 409. If these two are equal, the voltage appearing at point 409 will be one-half the voltage appearing at point 411. The auto-transformer action of inductance 408 doubles the voltage generated by triode 406 in the lower half of coil 408 resulting in a net feed back of unity, a requirement which must be satisfied for obtaining undamped oscillations. If resistance 413 is too large, the feed back will be less than unity and the oscillations will still be damped, but with a larger time constant than the one observed with no feed back circuit. If resistance 413 is too small, the feed back will be greater than unity, and the oscillations will build up until the losses in triode 406 are sufficient to make a feed back equal to unity. When this occurs, the circuit is operating as an ordinary "Hartley" oscillator with all the concomitant instability. The stability of the pulse oscillator depends upon "Class A" operation of triode 406, which may be obtained by adjusting resistance 413. The correct value of resistance 413 will depend upon the Q of coil 408, and, hence, resistance 413 must be adjustable. The amplitude of the oscillations is proportional to the current flowing in triode 404 prior to "cut-off," and can be controlled by varying resistance 416. The negative amplitude of the rectangular wave 6—23 applied to the grid of triode 404 for making the latter non-conductive for the duration of the rectangular wave, must be sufficiently large to keep triode 404 non-conductive even when the voltage at point 411 reaches its maximum negative value. When the negative bias impressed on the grid of triode 404 by the rectangular wave 6—23 is removed, triode 404 becomes fully conductive shunting the L.-C. circuit; the oscillations cease and the oscillator again assumes quiescent condition.

The oscillations generated by the pulse oscillator 406 are illustrated at 6—24 in Fig. 6. They are impressed on the shaping amplifier 424, which is overdriven in the positive and negative directions by the constant amplitude sine wave impressed on its grid. A substantially square wave is applied to the grid of a triode 426, the latter being coupled to the plate circuit of triode 424 by a coupling condenser 425 and resistances 427, 429, resistance 429 being shunted by condenser 428, resistance-condenser combination 429, 428 being used as a frequency compensated voltage divider.

A choke coil 430 is connected in the plate circuit of triode 424, thus preventing the high frequencies from entering the plate supply circuit. A pulse transformer 432, having a resonant frequency in the order of one megacycle and a relatively low Q, is connected in the plate circuit of triode 426. The rectangular wave impressed on the primary of transformer 432 is differentiated in its secondary which impresses the resulting peaked positive and negative pulses on a pulse-selecting twin triode 434—446.

The grid of triode 434 is connected to a negative biassing potential 438 through the secondary of the transformer and a resistance 436, this bias making triode 434 normally non-conductive. When a positive pulse is applied to the grid of triode 434, it is impressed over a resistance 440 and a coupling condenser 442 on the grid of a mixer stage composed of triodes 441 and 444. The signals impressed on the grid of triode 441 are illustrated at 6—25 in Fig. 6. The secondary of transformer 432 is shunted by a triode 446 which acts as a diode offering low impedance path to the negative pulses also appearing across the secondary; this prevents the negative pulses from having any effect on triode 434. The twin triode 441 and 444 acts as a mixer stage for the marker signals 6—25 and the video signals 6—26 impressed on its right side by the video channel illustrated in the lower portion of Fig. 4. The two signals are combined in a cathode resistance 443 which is connected to the control grid of a video amplifier 448. The signals impressed on the control grid of amplifier 448 are illustrated at 6—27 in Fig. 6, and the output of the latter is illustrated at 6—28 in the same figure. These are impressed on the cathode of the cathode ray tube 52 and, therefore, are used for intensity-modulating the beam current of the tube. The images produced by these signals on the screen are illustrated in Fig. 7 with the marker signals producing bright dots 710—712 and the video signals producing small arcs 714—716, etc. A D. C. restorer 450 is connected across resistance 452, thus, shunting any positive signals that may appear in the output of the video amplifier 448 because of the capacitive nature of the coupling circuits.

The video signals are impressed on the grid of triode 444 through a conductor 454 which is coupled to the plates of a video mixer comprising a double triode 455 and 456. The grids of the video mixer are connected to the No. 1 and No. 2 receivers through video amplifiers 457 and 458, and electronic switches including twin triodes 459, 460, 461 and 462. Positive signals are impressed by the No. 1 receiver on the negatively biassed linear amplifier 457 over conductor 11, this conductor being also shown in Fig. 1. The negative signals appearing in the output of the amplifier are impressed on the cathode of triode 459 through a coupling condenser 463. It is this triode that acts as an electronic switch normally blocking the output of the No. 1 receiver except during the duty cycles of the latter. The connections of this triode are as follows: its cathode and plate are connected through choke coils 464, 465 and resistances 466, 467 and 468 to the positive terminal of the source of plate potential 470, while its grid is directly connected to the plate of triode 460. Triode 460 is normally fully conductive because of the IR drop across the plate resistance 471, the plate of triode 460 and the grid of triode 459 are only a few volts above ground potential, the plate potential being determined by the voltage drop across the cathode-plate impedance of triode 460 when triode 460 is fully conductive. When triode 460 is fully conductive, triode 459 is completely blocked since its cathode is connected to the positive terminal of source 470 and, therefore, almost a full plate voltage is impressed on the cathode grid circuit with the cathode being positive and the grid negative. When the negative rectangular waves 6—9 are impressed on the grid of triode 460, they make it non-conductive, and the plate of triode 460 and the grid of triode 459 assume a positive potential equal to that of battery 470. At this instant the grid of triode 459 is, therefore, at the same potential as its cathode, and when negative signals are impressed on the cathode by condenser 463 they make triode 459 conductive. The video signals are impressed on the grid of the video mixer 456 which in turn impresses them over conductor 454 on the grid of the video and range marker mixer 444. Mixer 444 transmits them to cathode 66 of the cathode ray tube 52 as previously described in the specification where they intensity-modulate the electron beam of the tube. The functioning of the video amplifier 458, electronic switch 461, 462, and of the right side 455 of the video mixer is identical in all respects to the functioning of the corresponding elements in the No. 1 receiver channel. The video amplifier 458 is connected to the output of the No. 2 receiver over conductor 13, and the electronic switch 461 is connected to the output of the multivibrator in the No. 2 sweep channel over conductor 52. Negative rectangular waves 6—16 periodically unblock triode 462 during the duty cycles of No. 2 receiver and the video signals appearing in its output are impressed on mixer 455 which impresses them over conductor 454 on mixer 444. The resulting signals as they appear on the screen of the oscilloscope tube are illustrated in Fig. 7.

The operation of the radio locator should be apparent from the description of its block and schematic diagrams and, therefore, only a brief summary of the functioning cycle will be given here. In numerous operations of the radar locators, it is desirable to obtain complete surveillance of the space from the maximum obtainable range to the space directly above the radio locator up to a height of approximately 40,000 feet without any unscanned gaps or "dead space," sometimes called the "null effects," which may be present because the lobe pattern of a single antenna does not include all the space which must be under surveillance. Figure 8 illustrates the practical solution of this problem where the early warning lobe 800 fills in only a portion of rectangle 804, which must be under surveillance, and the remaining portion of the same rectangle is filled in by an auxiliary lobe 802, the two accomplishing the sought result. Lobe 800 is produced by antenna 26, while lobe 802 is produced by antenna 28, the antennas radiating the exploratory pulses in the opposite directions. In the previous systems it was customary to key the two transmitting channels connected to their respective antennas simultaneously, which resulted in a fifty per cent loss of the transmitter power when the locators used the bi-radial P. P. I. oscilloscope for reproducing the signals from the two receiving-channels. To avoid this loss of power alternate keying of the transmitting channels is accomplished by means of the modulator disclosed in Fig. 2. Because, an artificial line is used in each of the two modulators for controlling the length of the modulating pulse, it becomes possible to adjust the length of the transmitted pulse in each channel for obtaining the optimum operating conditions from the point of view of maximum range, signal-to-noise ratio, and definition of images on the oscilloscope screen, when the images are reproduced along two radial sweep vectors having different radial velocities. A blocking oscillator 210 generates a continuous series of pulses 6—1. These pulses are impressed on the pulse selector consisting of the "flip flop" multivibrator 216, 218, differentiating networks 219, 220 and 221, 222, and diodes 224, 226 connected to the differentiating networks which select and direct the pulses generated by the blocking oscillator so that every other pulse of the blocking oscillator is impressed on pulse of amplifier 228, and the remaining alternate pulses are impressed on pulse amplifier 230. The selected pulses are used in the ignitron keyers for discharging the artificial line through the ignitrons and the primary of an output transformer of the keyer, the secondary of which is connected to the plate circuit of the transmitter oscillator. An alternate keying of the transmitting channels is the result, so that the exploratory pulses are transmitted only in one direction at any given time. The direction of the radial sweep produced in the cathode ray tube 52 is made to coincide with the direction of the transmitted signal. To accomplish this result, the No. 1 and No. 2 sweep channels are synchronized with, and are operated by the transmitting channels by impressing either a portion of the transmitted pulse of the keying pulse on the sweep channels, the generated sweep in one channel being initiated by the transmitted pulse, while, in the other channel the generated sweep is delayed so that only the desired outer portion of the early warning range is reproduced on the oscilloscope screen. The receiving-channels are normally blocked by the dual triodes 459, 460 (Fig. 4), in No. 1 channel, and 461, 462 in No. 2 channel which act as two electronic switches controlled by the rectangular waves generated in the No. 1 and No. 2 sweep channels. The rectangular waves synchronously and alternately unblock the twin triodes, which transmit the selected signals to the video mixer 455, 456, video and range marker mixer 441, 444, video amplifier 448 and cathode 66 of the biradial oscilloscope tube 52 where they intensity-modulate the electron beam. The signals impressed on the cathode of the oscilloscope screen are illustrated at 6—28 in Fig. 6, and they comprise the combination of the echo signals and of the marker signals first from No. 1 receiver and then from No. 2 receiver. The marker channel includes a pulsed oscillator 406 and shaping amplifiers 424, 434 which convert the sinusoidal wave 6—24 generated by the pulsed oscillator into peaked pulses 6—25. These are combined with the echo signals in mixer 441, 444 which transmit the combined signal to the cathode of the oscilloscope tube.

Referring now to Figs. 9, 10 and 11, Figs. 9 and 10 disclose, respectively, the block and the schematic diagrams of the modulating and synchronizing channels of a radio locator of the type disclosed in Fig. 1, but with the two transmitters keyed continuously at different rates with the long range channel keyed at a relatively low rate as compared to the keying rate of the short range channel. Fig. 11 discloses the oscillograms of the signals appearing in the modulating channels, and some of the waves appearing in the sweep channels. Figs. 9 and 10 disclose the modulators and that portion of the synchronizing circuits which differs from the synchronizing circuits disclosed in the Figs. 1 and 2; the remaining circuits of the transmitting-receiving channels are identical to those disclosed in the Figs. 1, 4 and 5, and the connections between them and the circuits disclosed in the Figs. 9 and 10 will be indicated in their description that is to follow. Referring to Fig. 9, a blocking oscillator 900 generates a series of periodic pulses illustrated in Fig. 11 at 11—1, the periodicity of these pulses being adjusted so as to be equal to the desired keying rate of the short range channel. The output of the blocking oscillator is connected to a short range modulator 902 including an ignitron driver 903 and an ignitron modulator 904 whose outputs are illustrated at 11—2 and 11—3 respectively. The latter series of pulses is used for keying the oscillator of the short range transmitter which corresponds to the No. 2 transmitter designated by the numeral 24 in Fig. 1. The connection between the modulator and the transmitter is through a conductor 905, and with the auxiliary oscilloscopes—through conductor 70 (also see Fig. 1). The synchronization between the short range transmitting channel and No. 2 sweep channel designated by block 48 in Fig. 1 and the range marker channel 62, Fig. 1, is now obtained by connecting the synchronizing trigger output of modulator 904 to a gate tube, clamper and inverter 906 which is normally nonconductive, and thus blocks all keying pulses impressed upon it by modulator 904. The gate tube is periodically unblocked by the rectangular waves impressed upon it by an Eccles-Jordan multivibrator 914, the functioning of which is to render the gate tube conductive to the keying signals impressed upon it by modulator 904 for that period of time during which the long range channel remains idle. This will be described more fully in connection with the description of the modulating channel for the long range transmitter.

The long range modulating channel begins with a blocking oscillator and clamper 908 which is connected to the blocking oscillator 900, the blocking oscillator 900 controlling the repetition rate of the blocking oscillator 908. The parameters of the latter are so adjusted that oscillator 908 is capable of delivering a single oscillatory cycle for every four oscillatory cycles of oscillator 900, every fourth pulse of oscillator 900 making oscillator 908 to deliver a pulse illustrated at 11—5. Thereupon oscillator 908 blocks itself by accumulating a negative charge on its grid which prevents it from responding to the three consecutive pulses impressed upon its grid by oscillator 900. At the conclusion of this period, the accumulated negative charge leaks off with the result that the fourth pulse impressed upon it by oscillator 900 produces pulse 11—5. Oscillator 908 thus acts as a frequency divider with the frequency ratio being a 4-1 ratio. This ratio may be adjusted to any desired value, which is determined, as mentioned previously in the introductory part of this specification dealing with the discussion of the Equations 1–3, by the ratio of the short and long ranges and the desired range index RI, Equation 2, and minimum detectable pulse $P_{min}$, Equation 3 for the short range channel. The output of the blocking oscillator 908 is impressed on a long range modulating channel 910 which includes an ignitron driver 911 and an ignitron modulator 912. The output of the ignitron modulator 912 is impressed on the oscillator of the No. 1 transmitter 22, Fig. 1, over a conductor 913, an Eccles-Jordan multivibrator 914, and synchronizing circuits of the auxiliary oscilloscopes over a conductor 72 (also see Fig. 1). The pulses impressed on No. 1 transmitter are illustrated at 11—7, the output of ignitron driver 911—at 11—6, and the pulses impressed on multivibrator 914 at 11—8. The output of the first section of the Eccles-Jordan multivibrator 914 is illustrated at 11—9, and it is this wave that is impressed over a conductor 916 on the suppressor grid of the gate tube 906, the positive portion of 11—9 making the gate tube responsive to the signals impressed upon it by modulator 904. The gate tube 906 transmits a series of synchronizing pulses 11—10 which correspond to the pulses 11—4 impressed on the signal grid of the same tube. These pulses are inverted and then impressed as pulses 11—11 on the No. 2 sweep channel 48, Fig. 1, over a conductor 58, this conductor corresponding to the similarly numbered conductor 58 in Fig. 1. The circuits and functioning of the No. 2 sweep channel otherwise are identical to the circuits and functioning of the previously described sweep channel for the short range receiver. The synchronizing pulses 11—11 thus correspond to the synchronizing pulses 6—15 illustrated in the Figs. 2 and 6. Accordingly, the pulses 11—11 are impressed over conductor 58, Fig. 9 (corresponding to conductor 58, Figs. 1 and 5), on the grid of the twin triode 550, Fig. 5 which is the delayed multivibrator controlling the saw-tooth oscillator 554. With the output of the inverter connected to the multivibrator 550, the current saw-tooth waves appearing in the output of the saw-tooth amplifier 560 will be as those illustrated at 11—15 in Fig. 11. The synchronization between the long range modulating channel and the long range sweep channel, designated as No. 1 sweep channel in Fig. 1, is obtained by connecting the output of the second section of the multivibrator 914 to the delayed multivibrator 60, Fig. 1. The synchronizing pulses are shown at 11—13 in Fig. 11. These pulses correspond to the synchronizing pulses 6—6 in Fig. 6, where they perform the same function. The output of the saw-tooth generator 520, Fig. 5, when connected to Fig. 9 by conductor 56, is illustrated at 11—14, this wave corresponding to the saw-tooth wave 6—11 in Fig. 6.

Comparison of the signals in Fig. 6 with the signals illustrated in Fig. 11 reveals the fact that while in Fig. 6 the long and short range sawtooth waves 6—11 and 6—18 alternate as illustrated at 6—19, in Fig. 11, four short range sawtooth waves 11—15 are generated for each long range saw-tooth wave as illustrated at 11—16. Better image definition on the oscilloscope screens, with shorter exploratory pulses but faster keying rate, is the result.

Referring to Fig. 10 the circuits and the functioning of the blocking oscillator 1000 is identical to those of the blocking oscillator 210, Fig. 2, except that the parameters of oscillator 1000 are adjusted so that its repetition rate is higher than that of oscillator 210. The secondary of transformer 1002 is connected to the signal grid of the ignitron driver 1003 which corresponds to the ignitron driver 228 in Fig. 2. Since the repetition rate of the blocking oscillator 1000 is now adjusted to the repetition rate desired in the short range channel, the output of the blocking oscillator 1000 may be impressed directly on the grid of the ignitron driver 1003. A "clamp" triode 1004 is connected as a diode across the secondary of transformer 1002 offering low impedance for the negative pulses appearing across the secondary, thus acting as a dampening device for the transients which are likely to be present in the output of the blocking oscillator. The connections and functioning of driver 1003 and ignitrons 1006 and 1008 are identical to those of driver 228, and ignitrons 236, 250 in Fig. 2, and, therefore, need no additional description. Positive pulses are impressed on No. 2 transmitter by the secondary of a transformer 1009 with the result that the former transmits the exploratory pulses, the duration of which is determined by the time constant of an artificial line 1010. The modulating pulses produced by the discharge of artificial line 1010 are impressed over conductor 70 (also see Fig. 1), on the synchronizing circuits of the auxiliary oscilloscopes and on the signal grid of a gate pentode 1019 which is periodically biassed to "cut off" by the negative portion of the rectangular wave 11—9 impressed on its suppressor grid to which it is connected over a conductor 1036 and a coupling condenser 1034. The suppressor grid of the gate tube is connected to ground through a diode-connected triode 1012, which acts as a grounding resistance for the grid during the positive portions of the rectangular wave 11—9. The positive portion of the rectangular wave 11—9 makes pentode 1019 responsive to the signals impressed upon its signal grid by the artificial line 1010 with the result that negative pulses 11—10 appear in the plate circuit of the pentode. These pulses, after being inverted in an inverter 1013, are used for synchronizing the No. 2 sweep channel with the No. 2 transmitting channel during those periods of time which are assigned to the short range channel in the bi-radial oscilloscope. From the examination of Fig. 11, and especially the signals illustrated at 11—11 and 11—15, one may readily see that four exploratory cycles are impressed on the oscilloscope tube by the short range channel between the long range signals.

The modulating circuit for the long range channel begins with a blocking oscillator 1007 which is timed by the blocking oscillator 1000, the connection being accomplished through a conductor 1016, a primary of transformer 1018 and coupling condenser 1021. The function of this oscillator has already been described in connection with Fig. 9, and need not be repeated here. The output of oscillator 1007, illustrated at 11—5, is impressed on the grid of the ignitron driver 1011 which impresses the rectangular pulses 11—6 on the ignitor-cathode circuit of an ignitron 1020, thus ionizing ignitron 1020 as well as ignitron 1022, which in turn produces the discharge of an artificial line 1024 across the ignitrons and the primary of an output transformer 1026. The secondary of the transformer is connected to the plate circuit of the oscillator in the No. 1 transmitter. The modulating pulses appearing in the primary of transformer 1026 are also impressed over conductor 72 (also see Fig. 1), on the synchronizing circuits of the auxiliary oscilloscopes, as well as on a multivibrator 1014 including triodes 1028 and 1030 which is used for suppressing every other pulse from the modulator so that only alternate modulating pulses of the No. 1 transmitter are used for timing the No. 1 sweep channel, and for periodically suppressing the modulating signals in pentode 1019 by means of rectangular wave 11—9 impressed on the suppressor grid of the pentode through condenser 1034 and conductor 1036. Synchronization of the No. 1 transmitting channel with the No. 1 sweep channel is accomplished by impressing the differentiated form 11—13 of waves 11—12, the latter appearing in the plate circuit of triode 1030, on the grid of triode 500, Fig. 5, the connection being over conductor 56, resistor 502 and coupling condenser 501. The differentiating network 920, in Fig. 9, which is not shown in Fig. 10, represents, in this case, condenser 501 and resistance 502 shown in Fig. 5.

Figs. 12 and 13 disclose the block and schematic diagrams respectively of only that portion of the modulating circuits which differ from the modulating circuits disclosed in the Figs. 1 and 2. The main block diagram of the system is identical to the one disclosed in Fig. 1 with the exception of the circuits beginning with the blocking oscillator 10 and including pulse frequency divider 12 and differentiating network, separator, and shaper blocks 14 and 16. These four elements are substituted by the seven elements illustrated in Fig. 12, the functioning of which will be described presently. A blocking oscillator 1200 generates pulses 14—1, Fig. 14, the repetition rate of these pulses being adjusted to the keying rate desired in the short range channel. These pulses are impressed on a gate tube 1202, the functioning of which is identical to the functioning of the gate tube 1019, Fig. 10, i. e., it transmits only an interrupted series of pulses 14—4 to an ignitron driver 1204, this driver performing the same function as ignitron driver 228, Fig. 2, or driver 1003 in Fig. 10. The output of the ignitron driver is illustrated at 14—5 in Fig. 14. Examination of the oscillograms illustrated in Fig. 14 reveals the fact that in this system the short range transmitter is keyed at a faster rate than the keying rate of the long range transmitter with the short range transmitter being keyed only during the idle periods of the long range transmitter. In other words, there is an alternate or intermittent keying of the transmitters, as is the case in Fig. 1, except that the No. 2 transmitter is keyed at a faster rate than the No. 1 transmitter during the intervals of time assigned to the No. 2 transmitter.

In order to obtain a series of periodic pulses for keying the No. 1 transmitter, the output of the blocking oscillator 1200 is connected to the input of the blocking oscillator 1206 which is "paced" by oscillator 1200 in a manner illustrated in Fig. 14 where the output of oscillator 1206 is shown at 14—2. As in the case of the Figs. 9 and 10, the blocking oscillator 1206 acts as a frequency divider with the frequency ratio of the two oscillators being again a 4—1 ratio. The output of the oscillator 1206 is impressed on a multivibrator 1208 which, together with a differentiating network 1210 and ignitron driver 1212, suppress every other pulse generated by oscillator 1206 so that the pulses impressed on an ignitron driver 1212 are those illustrated at 14—7, and the output of the driver are the pulses illustrated at 14—8. The ignitron driver 1212 corresponds to the ignitron driver 230 in Fig. 2. All remaining keying and synchronizing circuits in the system illustrated in the Figs. 12 and 13 are identical to those illustrated in the Figs. 1 to 5. Because of lack of space in the drawing, the saw-tooth waves impressed on the deflection coils 45 and 47 of the oscilloscope tube are not illustrated in Fig. 14. However, they are identical in all respects to the oscillograms illustrated at 11—15 in Fig. 11, and comprise long range saw-tooth waves separated by the four short range saw-tooth waves. Direct synchronization from the output circuits of the modulating channels is possible in this system in the manner illustrated in the Figs. 1, 2, 4 and 5, since Figures 12 and 13 disclose a system where the two transmitters are keyed alternately and, as a consequence, one modulator remains in the quiet condition while the other modulator is active.

The schematic diagram of the modulator is disclosed in Fig. 13 and needs only a brief description since the functioning of the individual elements of the circuits disclosed in this figure has been already described in connection with the previously described Figure 10. The blocking oscillator 1300 is again coupled by means of pulse transformers 1301 and 1302 and a coupling condenser 1304 to a frequency dividing blocking oscillator 1306. The output of oscillator 1306 is also impressed over a conductor 1307 on the grid of the gate tube 1303. The blocking oscillators are provided on their output sides with the clamping diodes 1308 and 1310. Oscillator 1306 controls the position of a multivibrator 1309. The output of the first stage of the multivibrator, which is triode 1312, is connected over a conductor 1316 to the grid of the ignitron driver 1313, whose output is connected over a conductor 1320 to the ignitor-cathode circuit of ignitron 238, Fig. 2, transformer 1322 in Fig. 13 corresponding to transformer 234, and beam tube 1313—to tube 230 in Fig. 2, the remaining modulator circuits of the No. 1 transmitting-receiving channels being not illustrated in Fig. 12.

The modulating circuits of the No. 2 transmitting channel include a gate tube 1303, a clamping diode 1324, an inverter 1325, and a beam amplifier 1305, which generates pulses 14—8 and impresses them on the ignitor-cathode circuit of ignitron 236, Fig. 2. As in the case of the No. 1 transmitting-receiving channels, the remaining circuits in the No. 2 transmitting-receiving channels are identical to those shown in Fig. 1, and, therefore, need no additional description. The beam amplifier 1305 thus corresponds to the beam amplifier 228, and pulse transformer 1326 corresponds to the pulse transformer 232 in Fig. 2.

As outlined in the introductory part of the specification, the advantages of the disclosed radio locators reside in the fact that there is a continuous full utilization of the transmitted power by the receiving-channels (Figs. 1 to 4 and 12 to 14), reproduction of the received echoes on the screen of a single oscilloscope without any diminution of the signal-to-noise ratio, and the length of the transmitted pulses are made to produce the optimum range characteristics and definition of the images on the oscilloscope screens. In Figs. 10 to 14 the performance of the short range channel is further improved by assigning to it a higher keying rate. All circuits in the receiving-channels are rigidly controlled by the transmitted pulses so that it is unnecessary to have any rigid control of the frequency of the oscillators generating the keying pulses for the modulators. When the circuits are used in connection with the locators having long and short range lobes, circuits are provided for selecting the desired portion of the long range for its reproduction on the oscilloscope screen. The marker channel is periodically "paced" by the transmitters and is capable of generating marker signals of a fraction of a microsecond duration, thus avoiding the obliteration of the echo images on the oscilloscope screen.

The modulators alternately keying the transmitters use ignitrons of standard, commercial type which possess long life and the artificial lines, which are also known in the art as the "Guillenin" lines, can deliver keying pulses of any desired duration, from a fraction of a microsecond and up, and of very large power, in the order of two megawatts. Although two modulators are used for obtaining the desired result, the total weight of the modulators is less than the weight of a single modulator used in the systems of this type in the past.

In describing the radio locator, references were made throughout the specification to "echoes" and "echo signals," which ordinarily have a meaning in the art of radio locators, a re-radiated energy, or that energy which is re-radiated by the objects capable of reflecting or re-radiating the radio waves, when these objects find themselves in the path of the transmitted radio waves. There are now in use additional types of radio locating systems in which the objects are equipped with the transmitters which send signals in response to the reception of radio energy, the systems of the latter type being known as "Identification Friend or Foe Systems," or IFF systems. The radio locator disclosed in this specification may function equally well with either type of "echo" signals, and, as a consequence, the term "echo" as used herein is not to be restricted to signals which are reflected or passively re-radiated by a body. This term is also used to signify any automatic response to a signal, viz., that obtained by means of a normally inoperative transmitter, located on said body, and which, when keyed by a pulse transmitted toward said body, automatically functions to send an answering pulse, either on the same frequency as said transmitted pulse, or on a different frequency.

It is believed that the construction and operation of the radio locators, as well as the advantages thereof, will be apparent from the foregoing description. It should be understood that while the invention has been shown in several preferred forms reasonable changes and modifications may be made without departing from the spirit of the invention as sought to be defined in the following claims.

We claim:

1. In a radar system provided with a bi-radial oscilloscope having a cathode-ray beam and a screen, said oscilloscope being connected to first and second transmitter-receiver combinations, said transmitters periodically transmitting exploratory pulses and said receivers receiving echoes of said pulses, the system of timing the oscilloscope circuits which includes means for generating a first keying pulse; means for keying said first transmitter by means of said first keying pulse; means for timing the generation of a first rectangular wave by means of said first keying pulse; means for generating a first sweep wave for said oscilloscope in synchronism and in phase with said first rectangular wave; means for generating a second keying pulse lagging said first pulse; means for keying said second transmitter by means of said second keying pulse; means for timing the generation of a second rectangular wave by means of said second keying pulse; means for generating a second sweep wave in synchronism and in phase with said second rectangular wave, and synchronizing the reproduction on the screen of said oscilloscope of the echoes received by said first and second receivers by unblocking said first receiver by means of said first rectangular wave, and by unblocking said second receiver by means of said second rectangular wave.

2. The system of timing oscilloscope circuits as defined in claim 1, which further includes means for varying the time of occurrence of one of said rectangular waves with respect to its keying pulse, and its duration, for selecting any desired portion of the available range of the corresponding transmitter-receiver combination.

3. In a radio object locating system including a long range transmitter, a short range transmitter, a source of intermittent pulses, a first pulse selector connected to said source for selecting only odd pulses generated by said source, a first modulator interconnecting said first selector and said long range transmitter, a first artificial line included in said first modulator, and means for periodically discharging said first line with the aid of said first pulse selector for modulating said long range transmitter, said first line having parameters for generating a modulating pulse the duration of which is adjusted for the optimum operating condition of said long range channel; a second pulse selector connected to said source for selecting only even pulses generated by said source, a second modulator interconnecting said second selector and said short range transmitter, a second artificial line included in said second modulator, and means for periodically discharging said second line with the aid of said second pulse selector for modulating said short range transmitter, said second line having parameters for generating a modulating pulse the duration of which is adjusted for the optimum operating conditions of said short range channel.

4. A radio object locating system for determining range and azimuth of the objects producing echoes in response to exploratory pulses, including a pulse generator, first and second keyers connected to said generator, said first keyer producing a keying pulse for each odd pulse of said generator, and said second keyer producing a keying pulse for each even pulse of said generator, first and second transmitters connected to and keyed by said first and second keyers respectively, first and second directional antennas connected respectively to said first and second transmitters, said antennas being mounted for pointing their respective lobes in the diametrically opposite directions, first and second duplexing circuits and first and second receivers connected so said first and second antennas respectively through said duplexing circuits, first and second sweep generating channels connected to said keyers respectively, said first sweep channel generating a sawtooth wave of one polarity in response to said first keying pulse and said second sweep channel generating a sawtooth wave of the opposite polarity in response to said second keying pulse, a plan position indicator having a cathode ray beam and electromagnetic deflection coils for deflecting said beam, means for synchronously rotating the deflection coils and said directional antennas, and connections between said first and second sweep channels and said coils whereby said beam is deflected first in one radial direction and then in substantially diametrically opposite direction.

5. A radio object locating system as defined in claim 4 which further includes connections between said first and second receivers and said cathode ray tube for intensity-modulating the cathode ray beam in said tube for reproducing on its screen the output of the first receiver along one sweep and the output of the second receiver along the second sweep, and connections between said first sweep channel and said first receiver, and said second sweep channel and said second receiver for unblocking the respective receivers during the generation of the linear portions of the saw-tooth waves.

6. A radio object locating system for determining range and azimuth of the objects producing echoes in response to exploratory pulses including a pulse generator, first and second keyers, a first circuit connecting said first keyer to said generator, a second circuit connecting said second keyer to said generator, said circuits having means whereby said first keyer generates a keying pulse for each pulse of said generator and said second keyer generates a keying pulse for a predetermined number of pulses which is greater than one of said generator, a first long range transmitter and a second short range transmitter connected to and keyed by said first and second keyers respectively, first and second directional antennas connected respectively to said first and second transmitters, said antennas being mounted for pointing their respective lobe axes in diametrically opposite directions; first and second duplexing networks and first and second receivers connected to said first and second antennas respectively, networks connecting first and second sweep generating channels to said keyers respectively, said networks having means whereby said first channel generates a successive plurality of sawtooth waves of one polarity in response to a successive plurality of the first keying pulses while said second sweep channel remains idle and said second sweep channel generates a sawtooth wave of the opposite polarity in response to every other second keying pulse while said first sweep channel remains idle.

7. A radio object locating system as defined in claim 6 wherein said receivers are normally blocked, and further including a cathode ray tube; deflection coils rotatively mounted on said cathode ray tube, instrumentalities for synchronously rotating said antennas and said coils, connections between said first and second sweep channels and said coils whereby said channels impress upon said coils the sawtooth waves for generating a rotating bi-radial sweep pattern on the screen of said tube, connections between said first and second receiver and said cathode ray tube for intensity modulating the cathode ray beam in said tube for reproducing on its screen the output of the first receiver along one sweep and the output of the second receiver along the second sweep, and connections between said first sweep channel and said first receiver, and said second channel and said second receiver for unblocking the respective receivers during the generation of said sawtooth waves.

8. A radio object locating system for determining range and azimuth of the objects producing echoes in response to exploratory pulses including a pulse generator, generating a series of periodic, equally spaced pulses; first and second keyers connected to said generator through first and second networks respectively, said first network keying said first keyer at a rate whereby said first keyer generates a first keying pulse for each pulse of said generator while said second keyer remains idle, said second network keying said second keyer at a rate whereby said second keyer generates a second keying pulse for a predetermined number of pulses of said generator while said first keyer remains idle, a first long range transmitter and a second short range transmitter connected to and keyed by said first and second keyers respectively, whereby said transmitters are keyed alternately at two different rates, the duty cycle of the second transmitter being equal to the duty cycle of the first transmitter, first and second directional antennas connected respectively to said first and second transmitters, said antennas being mounted for pointing their respective lobe axes in diametrically opposite directions, first and second duplexing circuits and first and second receivers connected to first and second antennas respectively, first and second sweep generating channels connected to said keyers respectively, said first sweep channel generating a sawtooth wave of one polarity in response to said first keying pulse, and said second sweep channel generating a sawtooth wave of the opposite polarity in response to said second keying pulse.

9. A radio object locating system as defined in claim 8, wherein said receivers are normally blocked, and further including a cathode ray tube; deflection coils rotatively mounted on said cathode ray tube, instrumentalities for synchronously rotating said antennas and said coils, connections between said first and second sweep channels and said coils whereby said sweep channels impress upon said coils the sawtooth waves for generating a rotating biradial sweep pattern on the screen of said tube, connections between said first and second receivers and said cathode ray tube for intensity modulating the cathode ray beam in said tube for reproducing on its screen the output of the first receiver along one sweep and the output of the second receiver along the second sweep, and connections between said first sweep channel and said first receiver, and said second channel and said second receiver for unblocking the respective receivers during the generation of the linear portions of said sawtooth waves.

10. The system of object location by means of radiant energy, comprising means for exploring for objects in a first, low elevation angle direction by means of a first series of pulses and the echoes thereof from objects in the path of said pulses; means for exploring in a high elevation angle direction opposite to said first one by means of a second series of pulses and the echoes thereof; means for simultaneously varying the azimuth of said directions of exploration; and means for indicating the respective echoes in a bi-radial relationship in accordance with the respective instantaneous directions being explored; said first and second series of pulses being related such that a predetermined number of pulses of said second series occur for each pulse of said first series.

11. The system of object location by means of radiant energy, comprising means for exploring for objects in a first direction in a given long range, low elevation angle radiation pattern by means of a first series of pulses and the echoes thereof from objects in the path of said pulses; means for exploring for objects in a direction opposite to said first direction in a given shorter range high elevation angle pattern complementary to said long range pattern by means of a second series of pulses and the echoes thereof; the pulses of said first and second series having a duration proportional to and a frequency of occurrence inversely proportional to said long and said shorter range respectively, a predetermined number of pulses of said second series occurring for each pulse of said first series; and means for simultaneously varying the azimuth of said direction of exploration and indicating the respective echoes in a bi-radial relationship in accordance with the respective instantaneous directions being explored.

12. The system according to claim 11, wherein the exploring said two directions takes place in alternation.

WILLIAM A. HUBER.
NICHOLAS T. VOLSK.

REFERENCES CITED

The following references are of record in the file of this patent:

UNITED STATES PATENTS

| Number | Name | Date |
| --- | --- | --- |
| 2,189,549 | Hershberger | Feb. 6, 1940 |
| 2,205,560 | Herzog | June 25, 1940 |
| 2,225,046 | Hunter | Dec. 17, 1940 |
| 2,312,203 | Wallace | Feb. 23, 1943 |
| 2,403,622 | Tuska | July 9, 1946 |
| 2,403,625 | Wolff | July 9, 1946 |
| 2,415,094 | Hansen | Feb. 4, 1947 |
| 2,419,239 | White | Apr. 22, 1947 |
| 2,419,525 | Alford | Apr. 29, 1947 |
| 2,423,024 | Hershberger | June 24, 1947 |
| 2,440,250 | Deloraine | Apr. 27, 1948 |
| 2,444,452 | Labin | July 6, 1948 |
| 2,480,123 | Deloraine | Aug. 30, 1949 |
| 2,514,617 | Albershiem | July 11, 1950 |
| 2,515,178 | Barchok | July 18, 1950 |

FOREIGN PATENTS

| Number | Country | Date |
| --- | --- | --- |
| 803,926 | France | July 20, 1936 |
| 542,634 | Great Britain | Jan. 21, 1942 |
| 577,824 | Great Britain | June 3, 1946 |